US011023523B2

United States Patent
Hauptmann et al.

(10) Patent No.: US 11,023,523 B2
(45) Date of Patent: Jun. 1, 2021

(54) VIDEO CONTENT RETRIEVAL SYSTEM

(71) Applicant: Alexander G. Hauptmann, Finleyville, PA (US)

(72) Inventors: Alexander G. Hauptmann, Finleyville, PA (US); Lu Jiang, Pittsburgh, PA (US); Po-yao Huang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/769,233

(22) PCT Filed: Oct. 24, 2016

(86) PCT No.: PCT/US2016/058440
§ 371 (c)(1),
(2) Date: Apr. 18, 2018

(87) PCT Pub. No.: WO2017/070656
PCT Pub. Date: Apr. 27, 2017

(65) Prior Publication Data
US 2018/0293313 A1 Oct. 11, 2018

Related U.S. Application Data

(60) Provisional application No. 62/285,256, filed on Oct. 23, 2015.

(51) Int. Cl.
*G06F 16/71* (2019.01)
*G06F 16/78* (2019.01)
(Continued)

(52) U.S. Cl.
CPC ............ *G06F 16/71* (2019.01); *G06F 16/738* (2019.01); *G06F 16/78* (2019.01);
(Continued)

(58) Field of Classification Search
CPC ....................................................... G06F 16/71
(Continued)

(56) References Cited

U.S. PATENT DOCUMENTS 9,075,825 B2 7/2015 Chen
2011/0055233 A1* 3/2011 Weber .................. G06F 16/322
707/752

(Continued)

FOREIGN PATENT DOCUMENTS

WO WO2017/070656 4/2017

OTHER PUBLICATIONS

International Search Report dated Jan. 19, 2017 for Application No. PCT/US2016/058440, 2 pages.
(Continued)

*Primary Examiner* — Syling Yen
(74) *Attorney, Agent, or Firm* — Fish & Richardson P.C.

(57) ABSTRACT

This document describes a search retrieval system for automatically indexing data representing audio-visual recordings and for querying, responsive to a search query, that indexed data representing the audio-visual recordings. The search retrieval system defines weights for semantic features of an audio-visual recording and extracts, based on execution of a first set of rules, one or more semantic features. The system determines a weight for each of the one or more semantic features. A search engine searches nodes in the graph of the semantic features to identify one or more logical relationships for the one or more semantic features extracted. The weights for each of the one or more semantic features are adjusted based on the graph. The data is indexed in association with the one or more adjusted weights for the one or more semantic features, respectively.

24 Claims, 19 Drawing Sheets

(51) Int. Cl.
  *G06F 16/783* (2019.01)
  *G06F 16/738* (2019.01)
  *G06N 5/02* (2006.01)
(52) U.S. Cl.
  CPC ...... *G06F 16/7834* (2019.01); *G06F 16/7837* (2019.01); *G06F 16/7844* (2019.01); *G06N 5/025* (2013.01)
(58) Field of Classification Search
  USPC ........................................................ 707/798
  See application file for complete search history.

(56) References Cited

U.S. PATENT DOCUMENTS

| | | | | |
|---|---|---|---|---|
| 2012/0290950 | A1* | 11/2012 | Rapaport | H04N 21/8358 715/753 |
| 2014/0366068 | A1* | 12/2014 | Burkitt | H04N 21/431 725/61 |
| 2015/0120717 | A1* | 4/2015 | Kim | G06F 16/335 707/727 |

OTHER PUBLICATIONS

Cees GM Snoek and Marcel Worring, "Concept-based video retrieval," Foundations and Trends in Information Retrieval, 1-99, 2008.
Lu Jiang et al., "Zero-example event search using multimodal pseudo relevance feedback," International Conference on Multimedia Retrieval, pp. 1-8, ACM 2014.
Jeffrey Dalton et al.; "Zero-shot video retrieval using content and concepts," Proceedings of the 22$^{nd}$ ACM international conference on Conference on information & knowledge management, pp. 1857-1860, ACM, 2013.
Amirhossein Habibian et al., "Composite concept discovery for zero-shot video event detection," Proceedings of International Conference on Multimedia Retrieval, pp. 1-8, ACM, 2014.
Masoud Mazloom et al., "Few-example video event retrieval using tag propagation," Proceedings of International Conference on Multimedia Retrieval, pp. 1-5, ACM, 2014.
Lu Jiang et al., "Bridging the ultimate semantic gap: A Semantic search engine for internet videos," Proceedings of International Conference on Multimedia Retrieval, ACM, 2015, pp. 1-8.
Wei Tong et al., "E-lamp: integration of innovative ideas for multi-media event detection," Machine vision and applications, pp. 1-11 (2013).
Ehsan Younessian et al., "Multimodal knowledge-based analysis in multimedia event detection," Proceedings of the 2$^{nd}$ ACM International Conference on Multimedia Retrieval, pp. 1-8, ACM, 2012.
Zhen-zhong Lan et al., "Double fusion for multimedia event detection," Springer, 2012, pp. 173-185.
Kenneth Ward Church and Patrick Hanks, "Word association norms, mutual information and lexicography," Computational linguistics, pp. 76-83, 1990.
Tomas Mikolov et al., "Distributed representations of words and phrases and their compositionality," Advances in Neural Information Processing Systems, pp. 1-9, 2013.
M.R. Naphade and J.R. Smith, "On the detection of semantic concepts at trecvid," MM, 2004, pp. 660-667.
C. Snoek et al., "Mediamill at trecvid 2013: Searching concepts, objects, instances and events in video," TRECVID, 2013, pp. 1-6.
M. Naphade et al., "Large-scale concept ontology for multimedia," MultiMedia, IEEE, 13(3):86-91, 2006.
L. Jiang et al., "Leveraging high-level and low-level features for mutlimedia event detection," MM, 2012, pp. 1-29.
S. Wu et al., "Zero-shot event detection using multi-modal fusion of weakly supervised concepts," CVPR, 2014, pp. 4321-4328.
L. Jiang et al., "Easy samples first: Self-paced reranking for zero-example multimedia search," MM, 2014, pp. 1-10.
H. Lee, "Analyzing complex events and human actions in "in-the-wild" videos," UMD Ph.D Theses and Dissertations, 2014, pp. 1-122.
Tessa Lau and Eric Horvitz, "Patterns of search: analyzing and modeling web query refinement," Springer, 1999, pp. 1-10.
Claudio Carpineto and Giovanni Romano, "A survey of automatic query expansion in information retrieval," ACM Computing Surveys, 44(1):1, 2012, pp. 1-50.
Kriengkrai Porkaew and Kaushik Chakrabarti, "Query refinement for multimedia similarity retrieval in mars," Proceedings of the seventh ACM international conference on Multimedia (Part 1), pp. 235-238, 1999.
Chahab Nastar et al., "Efficient query refinement for image retrieval," Computer Vision and Pattern Recognition, 1998 IEEE Computer Society Conference on pp. 547-552.
Greg Pass and Ramin Zabih, "Histogram refinement for content-based image retrieval," Applications of Computer Vision, 1996, pp. 1-7.
Matthew EJ Wood et al., "Iterative refinement by relevance feedback in content-based digital image retrieval," Proceedings of the sixth AMC international conference on Multimedia, pp. 13-20, 1998.
J. Deng et al., "Large-scale object classification using label relation graphs," ECCV, 2014, pp. 1-17.
M. Grant et al., "CVX: Matlab software for disciplined convex programming," 2017, pp. 1-25.
R. Tibshirani, "Regression shrinkage and selection via the lasso: a retrospecive," Journal of the Royal Statistical Society, Series B (Methodological), 73, Part 3, pp. 273-282, 2011.
M. Yuan and Y. Lin, "Model selection and estimation in regression with grouped variables," Journal of the Royal Statistical Society: Series B (Statistical Methodology), 68(1):49-67, 2006.
N. Simon et al., "A sparse-group lasso," Journal of Computational and Graphical Statistics, 22(2):231-245, 2013.
M.L. Fisher, "The lagrangian relaxation method for solving integer programming problems," Management science, 50(12):1861-1871, 2004.
A. Krizhevsky et al., "Imagenet classification with deep convolutional neural networks," NIPS, 2012, pp. 1-9.
Lu Jiang et al., "Self-paced learning with diversity," Advances in Neural Information Processing Systems, pp. 1-9, 2014.
Lu Jiang et al., "Self-paced curriculum learning," Proceedings of the Twenty-Ninth AAAI Conference on Artificial Intelligence, pp. 2694-2700, (2015).
Heng Wang and Cordelia Schmid, "Action Recognition with Improved Trajectories," ICCV 2013—IEEE International Conference on Computer Vision, pp. 3551-3558, Dec. 2013.

\* cited by examiner (a) Index (in GB)

(b) Search Time (in ms)

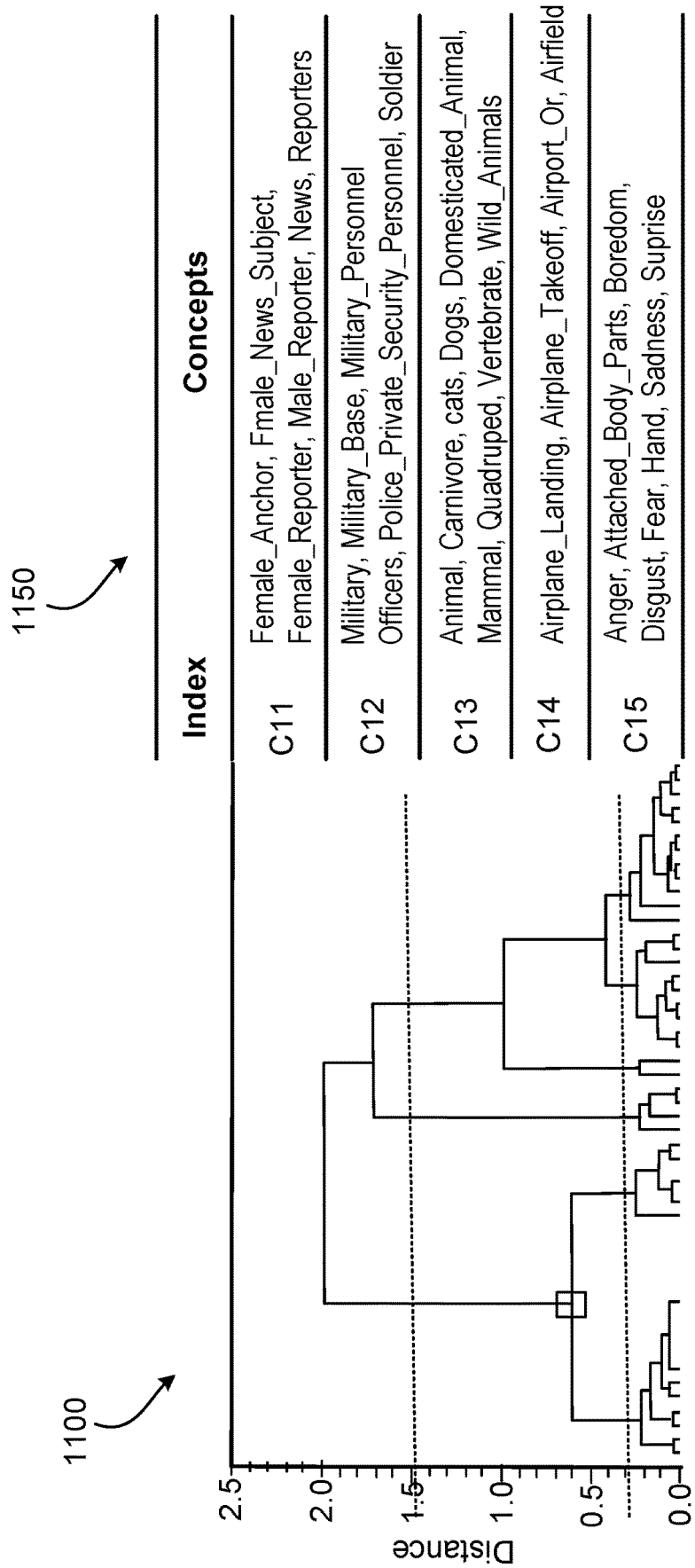
FIG. 11A (a) Bottom-up concept hierarchy generation
FIG. 11B (b) Concept Clustering

| GT Captions | Current MED | New |
|---|---|---|
| HVC00003:<br>"People skateboard." | primate<br>walking_running<br>person<br>amateur_video<br>leg<br>skateboarding | skateboarding<br>freestyle_scootering<br>aggressive_inline_skating<br>freeboard_(skateboard)<br>skating<br>walking_running |
| HCV014100:<br>"A group of people perform a tap dance routine" | person<br>entertaining<br>primate<br>leg<br>dancing | dancing<br>dancing<br>majorette_(dancer)<br>baton_twirling<br>entertaining |
| HVC20390:<br>"Two babies playing on a bed and talking to their mother." | person<br>primate<br>male_person<br>amateur_video<br>Indoor<br>child | baby<br>male_person<br>person<br>playing<br>speaking<br>zui_quan |

| garden | Prob | garden | Prob | traffic | Prob | traffic | Prob |
|---|---|---|---|---|---|---|---|
| garden | 0.1527 | garden | 0.1460 | india | 0.1460 | traffic | 0.2252 |
| hike | 0.1393 | tree | 0.1384 | travel | 0.1384 | driving | 0.1528 |
| yard | 0.1379 | flower | 0.1262 | traffic | 0.1262 | travel | 0.1190 |
| chainsaw | 0.1210 | grass | 0.1172 | motorcycle | 0.1172 | highway | 0.0965 |
| pond | 0.0868 | yard | 0.0976 | busi | 0.0976 | motorcycl | 0.0962 |
| forest | 0.753 | pond | 0.0908 | scene | 0.0908 | busi | 0.0662 |
| waterfal | 0.0734 | flower | 0.0785 | direct | 0.0785 | taxi | 0.0653 |
| chop | 0.0732 | wood | 0.0715 | highway | 0.0715 | car | 0.0548 |
| dirt | 0.0702 | dirt | 0.0715 | taxi | 0.0715 | truck | 0.0548 |
| N=23699 | | N=52854 | | N=23699 | | N=52854 | |

FIG. 13

(a) Quantitative error comparison

Concept_BoW:
sports478_12 bmx 1.00
sports478_13 freestyle_bmx 1.00
sports478_20 dirt_jumping 1.00 sports478_12 bmx
bike, 0.280424
trick, 0.228366
skateboard, 0.102340
ride, 0.065014
bicycle, 0.064789
kid, 0.056512
person, 0.055081
ramp, 0.052914
park, 0.050751
bmx, 0.043810

Hand-Crafted
sports478_176 freeboard_(skateboard) 0.5
sports478_186 mountainboarding 0.5
sports478_246 barrel_racing 0.5
sports478_280 superbike_racing 0.5
sports478_12 bmx 1.0
sports478_13 freestyle_bmx 1.0
sports478_9 unicycle 1.0
sports478_269 motorcycle_racing 1.0
sports478_281 supermoto 1.0
yfcc609_280 skating_trick 1.0
yfcc609_506 drop_from_bike 1.0
yfcc609_287 trick_style 1.0
sports478_20 dirt_jumping 2.0
yfcc609_41 bike 2.0
asrlong_0 query_asr_long 1

Exact match
sin346_224 old_person 1
sin346_230 person 1
sin346_296 standing 1
sports478_18 downhill_mountain_biking 1
sports478_265 show_jumping 1
sports478_46 tricking 1
dcnn1000_672 mountain_bike 1
dcnn1000_480 car_wheel 1
dcnn1000_740 potters_wheel 1
yfcc609_41 bike 1
yfcc609_12 ride 1
yfcc609_116 jump 1

1650

(b) Qualitative error comparison

FIG. 16B

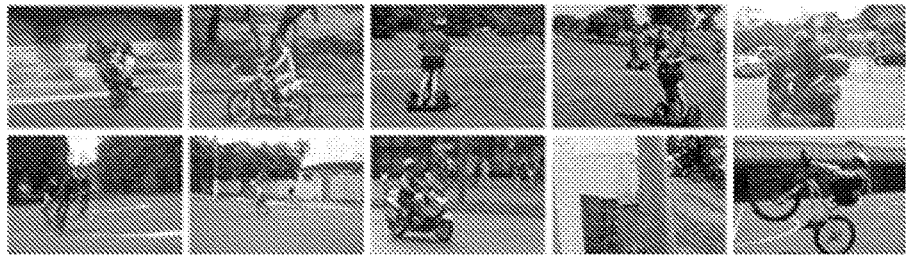
(a) SIN346 211: Motorcycle, P@10 = 4
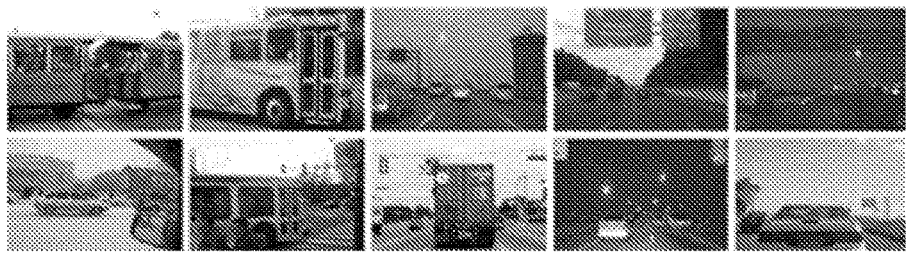
(b) SIN346 326: Truck, P@10 = 1
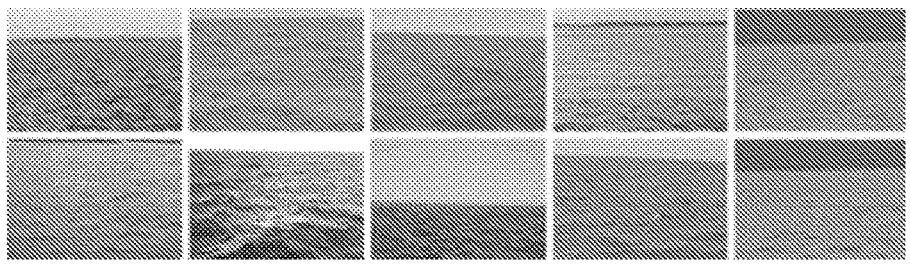
(c) YFCC609 520: whale, P@10 = 0
(d) YFCC609 396: hike, P@10 = 3
FIG. 17

VIDEO CONTENT RETRIEVAL SYSTEM

CROSS REFERENCE TO RELATED APPLICATIONS

This application is a § 371 National Stage Application of PCT/US2016/058440, filed on Oct. 24, 2016, which, in turn, claims the benefit of priority under 35 USC § 119(e) to U.S. Provisional Patent Application No. 62/285,256, filed on Oct. 23, 2015, the entire contents of each of which are hereby incorporated by reference.

GOVERNMENT SUPPORT CLAUSE

This invention was made with government support under IIS1251187 awarded by the National Science Foundation and D11PC20068 awarded by the Department of Homeland Security. The government has certain rights in the invention.

BACKGROUND

Searching semantic content in Internet videos has long been a goal of multimedia analysis and retrieval. This fundamental problem is a building block for many tasks such as video visualization, recommendation and summarization. As opposed to merely searching user generated metadata, such as titles and descriptions, content based semantic search strives to leverage concepts that are automatically detected in the video, such as objects/scenes/actions.

SUMMARY

This document describes multimedia retrieval and analysis. This document describes an automatic semantic query generation (SQG) method based on a novel probabilistic semantic concept embedding model, and bridges the semantic gap between available video concepts that the system can detect automatically and their textual representations in a large scale. The system can include an application interface for receiving a search query; an extraction engine in communication with the application interface over a communication network. The extraction engine is configured to perform operations including obtaining a first set of rules that define weights for semantic features of an audio-visual recording, wherein a weight specifies a likelihood of a semantic feature occurring in the audio-visual recording, extracting, based on execution of the first set of rules, one or more semantic features from the audio-visual recording, and determining, based on the execution of the first set of rules, a weight for each of the one or more semantic features. The system includes a logic execution engine for obtaining a second set of rules that define logical relationships between semantic features, wherein a logical relationship is represented by an edge between two nodes in a graph, and wherein each node in the graph represents a semantic feature. The system includes a search engine for, based on execution of the second set of rules, searching the nodes in the graph to identify one or more logical relationships for the one or more semantic features extracted, based on searching of the nodes, and adjusting one or more weights for each of the one or more semantic features, respectively. The system includes an indexing engine for automatically indexing data representing the audio-visual recording, with the data being indexed in association with the one or more adjusted weights for the one or more semantic features, respectively.

In some implementations, the semantic features comprise one or more of a visual feature, a textual feature, or an audio feature. The semantic features are indicative of one or more subjects of the audio-visual recording. Data representing the one or more semantic features extracted are each associated with a timestamp indicative of a time at which the semantic feature is presented during the audio-visual recording. In some implementations, the actions include receiving a search query indicative of one or more semantic features, and querying the index for indexed data representing one or more audio-visual recordings associated with the one or more semantic features indicated in the search query. In some implementations, the actions include, based on the indexed data, retrieving the one or more audio-visual recordings; and ranking the one or more audio visual recordings based on their adjusted weighting scores. The search query comprises one of a modality query, a text query, a temporal query, or a Boolean query. In some implementations, the second set of rules that define logical relationships between semantic features define a probability that a first semantic feature occurs with a second semantic feature in an audio-visual recording, wherein the one or more semantic features extracted comprise at least one of the first semantic feature or the second semantic feature. In some implementations, the logical relationship represents an inclusive logical relationship between a first node and a second node in which a first weighting score of a first semantic feature represented by the first node is less than the second weighting score of the second semantic feature represented by the second node. The logical relationship represents an exclusive logical relationship between a first node and a second node in which a semantic feature represented by either the first node or the second node has a specified weighting score. The actions include training the second set of rules by clustering one or more semantic features using labeled training data.

In some implementations, a method includes obtaining a first set of rules that define weights for semantic features of an audio-visual recording, wherein a weight specifies a likelihood of a semantic feature occurring in the audio-visual recording; extracting, based on execution of the first set of rules, one or more semantic features from the audio-visual recording; determining, based on the execution of the first set of rules, a weight for each of the one or more semantic features; obtaining a second set of rules that define logical relationships between semantic features, wherein a logical relationship is represented by an edge between two nodes in a graph, wherein each node in the graph represents a semantic feature; based on execution of the second set of rules, traversing the nodes in the graph to identify one or more logical relationships for the one or more semantic features extracted; based on traversal of the nodes, adjusting one or more weights for each of the one or more semantic features, respectively; and automatically indexing data representing the audio-visual recording, with the data being indexed in association with the one or more adjusted weights for the one or more semantic features, respectively.

In some implementations, the semantic features comprise one or more of a visual feature, a textual feature, or an audio feature. The semantic features are indicative of one or more subjects of the audio-visual recording. Data representing the one or more semantic features extracted are each associated with a timestamp indicative of a time at which the semantic feature is presented during the audio-visual recording. The actions include receiving a search query indicative of one or more semantic features; and querying the index for indexed data representing one or more audio-visual recordings associated with the one or more semantic features indicated in the search query. The actions include based on the indexed data, retrieving the one or more audio-visual recordings; and ranking the one or more audio visual recordings based on their adjusted weighting scores. The search query comprises one of a modality query, a text query, a temporal query, or a Boolean query. The second set of rules that define logical relationships between semantic features define a probability that a first semantic feature occurs with a second semantic feature in an audio-visual recording, wherein the one or more semantic features extracted comprise at least one of the first semantic feature or the second semantic feature. In some implementations, the logical relationship represents an inclusive logical relationship between a first node and a second node in which a first weighting score of a first semantic feature represented by the first node is less than the second weighting score of the second semantic feature represented by the second node. The logical relationship represents an exclusive logical relationship between a first node and a second node in which a semantic feature represented by either the first node or the second node has a specified weighting score. In some implementations, the actions include training the second set of rules by clustering one or more semantic features using labeled training data.

In some implementations, the system includes a computer readable medium for performing operations including obtaining a first set of rules that define weights for semantic features of an audio-visual recording, wherein a weight specifies a likelihood of a semantic feature occurring in the audio-visual recording; extracting, based on execution of the first set of rules, one or more semantic features from the audio-visual recording; determining, based on the execution of the first set of rules, a weight for each of the one or more semantic features; obtaining a second set of rules that define logical relationships between semantic features, wherein a logical relationship is represented by an edge between two nodes in a graph, wherein each node in the graph represents a semantic feature; based on execution of the second set of rules, traversing the nodes in the graph to identify one or more logical relationships for the one or more semantic features extracted; based on traversal of the nodes, adjusting one or more weights for each of the one or more semantic features, respectively; and automatically indexing data representing the audio-visual recording, with the data being indexed in association with the one or more adjusted weights for the one or more semantic features, respectively.

In some implementations, the system includes an application interface for receiving a search query; an extraction engine in communication with the application interface over a communication network, the extraction engine configured to perform operations comprising: receiving a video associated with metadata, the metadata comprising one or more of automatic speech recognition data, optical character recognition data, a textual description, and one or more semantic features, the one or more semantic features being indicative of one or more subjects of the video, wherein a weight specifies a likelihood of a semantic feature occurring in the video; obtaining a first set of rules that define weights for the one or more semantic features detected for a video using the metadata; extracting, based on the first set of rules, the one or more semantic features from the video; determining, based on the first set of rules, a weighting score for each of the one or more semantic features; a logic execution engine for obtaining a second set of rules that define one or more logical relationships for the one or more semantic features, the second set of rules defining distributional logical relationships using a regularization term, and the second set of rules further defining a hierarchy of distributional logical relationships using a graph of nodes and edges, wherein a logical relationship is represented by an edge between two nodes in the graph, wherein each node in the graph represents a semantic feature; a search engine for, based on execution of the second set of rules, searching the nodes in the graph to identify the one or more distributional logical relationships for the one or more semantic features; based on the searching of the nodes, adjusting the weighting score for each of the one or more semantic features; adjusting the weighting score for each of the one or more semantic features using the regularization term; and automatically indexing data representing the video associated with the one or more semantic features each being associated with an adjusted weighting score.

BRIEF DESCRIPTION OF THE DRAWINGS

FIGS. 11A-11B show the qualitative results of concept hierarchy.

FIG. 12 shows the qualitative result of concept saliency with CS-IVF.

FIG. 13 demonstrates the effect of big data in semantic concept embedding.

FIGS. 16A-16B show an error analysis.

FIG. 17 illustrates the P@10 results.

DETAILED DESCRIPTION

Figure 1:
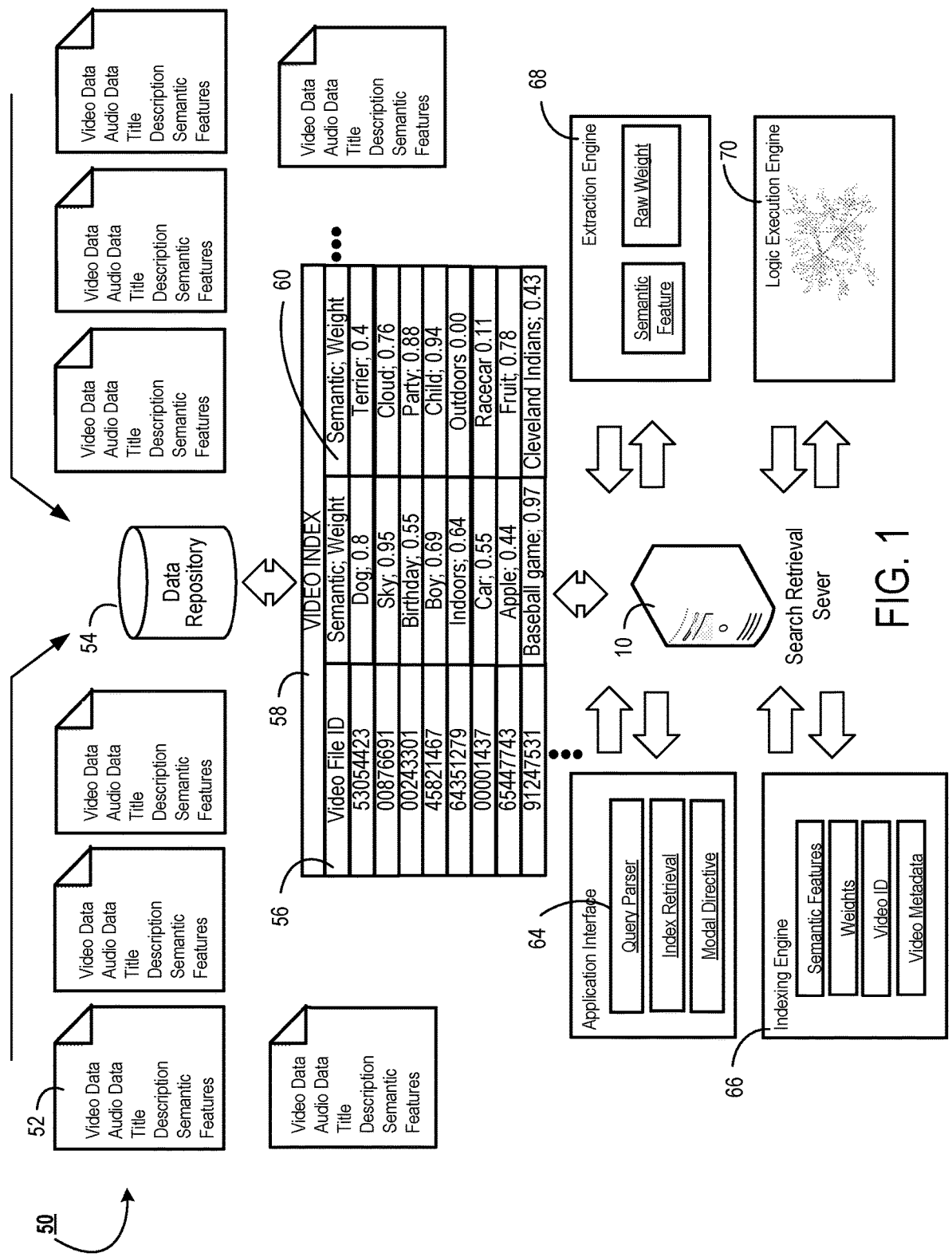
FIG. 1 shows an example of a search retrieval system.

Searching semantic content in Internet videos has long been a goal of multimedia analysis and retrieval. This fundamental problem is a building block for many tasks such as video visualization, recommendation and summarization. As opposed to merely searching user generated metadata, such as titles and descriptions, content based semantic search strives to leverage concepts that are automatically detected in the video, such as objects/scenes/actions. For example, in order to search for videos depicting a "birthday party", we might look for visual concepts like "cake", "gift" and "kids", and audio concepts like "birthday songs" and "cheering sounds". This semantic search relies on extensive video understanding, and requires neither metadata nor example videos provided by the user. According to the National Institute of Standards and Technology (NIST), semantic search in video is also known as zero example search (0Ex). A benchmark task called Multimedia Event Detection (MED) 0Ex, which was initiated by NIST TRECVID in 2013, is to detect the occurrence of a main event, e.g. "making a sandwich" or "rock climbing", occurring in a video clip without any user generated metadata or example videos.

A number of academic studies have demonstrated promising progress in this direction. However, existing methods index a video by the raw concept detection score that is dense and inconsistent. This solution is mainly designed for analysis and search over a few thousand videos, and cannot scale to big data collections required for real world applications. For example, in order to search the semantics in YouTube videos, a system should be able to search over billions of Internet videos. The scale problem is well beyond the scope of those methods, and thus, as shown in the experiments herein, their solutions will simply fail as the data grows. Large scale semantic search, though challenging, opens possibilities for many interesting applications. For example, a currently non-existing functionality is to search videos on social media platforms such as Facebook or Twitter. 12 million videos are posted on Twitter every day that have either no text or only a few words with little relevance to the visual content. It is extremely difficult to find meaningful information without content based semantic search. Another example relates to in-video advertising. Currently, it may be hard for companies to effectively place in-video advertisements as the user generated metadata typically does not describe the video content, let alone concept occurrences in time. However, a solution may be achieved by putting the advertisement into the top ranked relevant videos returned by the semantic search. For example, a sport shoe company may use the query "(running OR jumping) AND urban scene AND parkour" to select parkour videos for special shoe ads.

Even though a modern text retrieval system can already search over billions of text documents, the task is still very challenging for semantic video search. The main reason is that semantic concepts are quite different from the text words, and indexing of semantic concepts is still an understudied problem. Specifically, concepts are automatically extracted by detectors with limited accuracy. The raw detection score associated with each concept is inappropriate for indexing for two reasons. First, the distribution of the scores is dense, i.e. a video contains every concept with a nonzero detection score, which is analogous to a text document containing every word in the English vocabulary. The dense score distribution hinders effective inverted indexing and search. Second, the raw score may not capture the complex relations between concepts, e.g. a video may have a "puppy" but not a "dog". This type of inconsistency can lead to inaccurate search results.

Content based video retrieval systems that depend on low level features (e.g., visual and audio features) suffer from the problem of semantic gap. To bridge the semantic gap, concept based video retrieval have attracted large amount of research attentions in recent years. Concept based video retrieval facilitates searching in video by means of large sets of automatically detected concepts. This method has been widely used the recent year's TRECVID's Multimedia Event Detection (MED) tasks and has made a great progress in recent years. However, given the fact that users usually type only a few keywords to represent their search the selection of concise and effective concepts in semantic query becomes very critical and challenging.

Referring to FIG. 1, an example search retrieval system 50 includes a search retrieval server 10 in communication with a data repository 54. The data repository 54 includes audio-visual recordings 52 (e.g., videos) and their associated metadata, such as a title, identifier, description, timing data, and known semantic features.

The data repository 54 is indexed for quick retrieval of an audio-visual recording 52 by the search retrieval server 10. As described below, a video index allows 58 the search retrieval system 50 to retrieve video data in response to a search query more quickly relative to video data in a repository that is not indexed. The video index 58 includes a file ID 56 that identifies the audio-visual recording 52 for each entry and the semantic features and associated weights 60 for each entry. The video index 58 associates each extracted semantic feature for each audio-visual recording 52 that has been indexed. For example, an audio-visual recording can have a single extracted semantic feature or several extracted semantic features. Each extracted semantic feature is associated with an adjusted weight that indicates the relevance of the semantic feature in the video. For example, the weight can indicate the likelihood that the semantic feature is present in the audio-visual recording. In FIG. 1, video file 53054423 is associated with semantic feature "dog" with a weight of 0.8 and semantic feature "terrier" with a weight of 0.4. This example indicates that the video file 53054423 likely includes a representation of a dog, and that there is also some likelihood (though less likely) that the dog is a terrier or that a terrier is also represented in the video file. For example, if a weight for a semantic feature is 0.00, the semantic feature is known not to be represented in the video file, such as if a logical inconsistency was detected as described below.

Furthermore, the video index allows a list of search results to be presented to a user of the search retrieval system that is more relevant to terms used in the search query because the actual content of the video is searchable in addition to metadata associated with the audio-visual recordings 52. The video index also enables multimodal search queries. A search query can include one or more filters to search for semantic features of the videos. For example, a user can search for a particular semantic feature, such as "apple," but indicate that only video files with a threshold weighting should be returned, such as greater than 0.5. Thus, video file 65447743 in FIG. 1 would not be returned in a list of search results because the requisite semantic feature and weighting is not met. Other metadata can be indexed along with the semantic features and weights. In another example, a timestamp (not shown) can be associated along with the video file to show when in the video file the associated semantic feature was detected. The video index 58 increases the flexibility of the search retrieval system because a user can more precisely indicate which audio-visual recordings 52 should be returned. In addition to increasing the relevance of returned search results, searches can be performed more quickly and results can be returned to a user with less latency relative to searching a repository of audio-visual recordings that is not indexed or indexed without using semantic features.

Additionally, the search retrieval system 50 enables automatic indexing of audio-visual recordings 52 without the need for human intervention, such as writing video descriptions, titles, and creating other metadata used for conventional indexing of audio-visual recordings. Though metadata can be used to enhance the video index 58, the content of the audio-visual recordings 52 is used for indexing independent of metadata for each audio-visual recording 52.

An application interface 64 can be used to provide a platform for conducting search queries. For example, the application interface 64 can include a query parser, index retrieval, modal directive for multi-modal search, a sub-filter, one or more condition handlers, and so forth.

An indexing engine 66 can automatically index the data representing the audio-visual recordings 52 and associate the data with the semantic features, weights, metadata, and so forth. The extraction engine can use extraction rules to extract semantic features from the audio-visual recordings 52. As described below, the extraction engine determines which semantic features, such as from a known library of semantic features, are present in an audio-visual recording along with a raw weight indicating the probability that the semantic feature is present. As described below, the raw weight is adjusted for logical consistency with other semantic features extracted from the audio-visual recording 52. A logic execution engine 70 is used to obtain a set of rules that define logical relationships between the semantic features. As described below, a graph of nodes and edges can be used to determine a logical consistency between the semantic features, and a distributional relationship between extracted semantic features can be determined using a regularization term. The sets of rules used by the extraction engine and the logic execution engine enable the search retrieval system 50 to automatically determine relevant semantic features in audio-visual recordings 52. For example, while a user can watch the video or listen to audio to make one or more determinations of semantic features of the audio-visual recording, the search retrieval system 50 uses the rule sets of the extraction engine and the logic execution engine to automatically make determinations of which semantic features are present in the data and index the results of these determinations to achieve scalable search and retrieval of audio-visual recordings 52, such as for millions or billions of audio-visual recordings 52.

Figure 2:
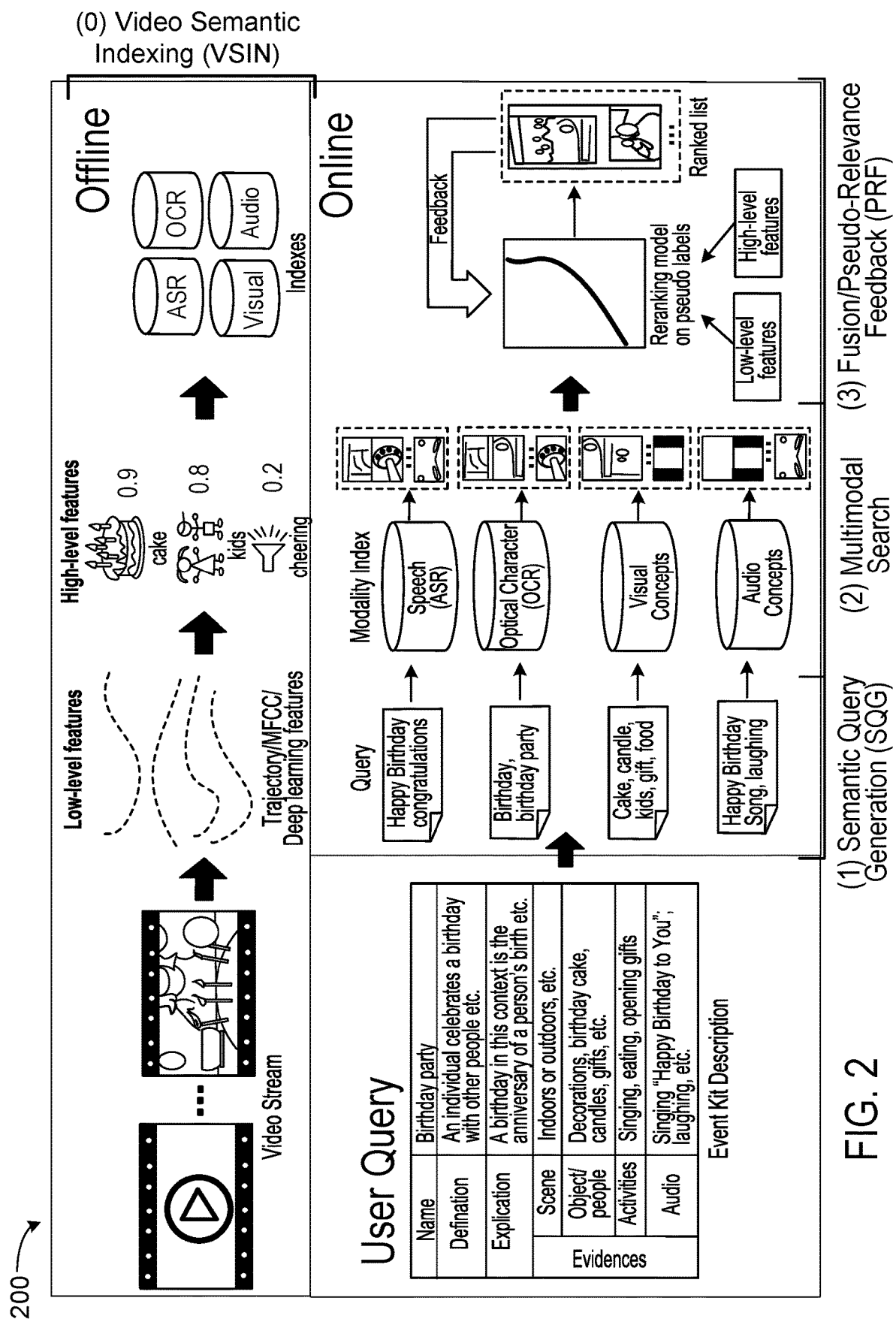
FIG. 2 shows a conceptual view of an exemplary 0Ex video search system.

The zero example search task (0Ex) in MED, simulates the real scenarios where users search video events in a large scale dataset with no metadata by using only query words with no video exemplar. A general view of an 0Ex system 200 is shown FIG. 2. For each event, NIST provides a text description called the event kit description, which includes a name, definition, explication and visual/acoustic evidence that is expected to be observed in the video. The 0Ex video retrieval systems solely rely on the event kit description for event search. Representation of the video using high-level visual concepts such as scene, object and action concepts are leveraged for retrieval. On the query side, queries of different modalities are extracted from the event kit description. Then the system retrieves a ranked list of videos with the query of each modalities and fuses these ranked lists to obtain a final ranking list. In some systems, relevance feedback is used to improve the search results. In state of the-art 0Ex retrieval systems, semantic query generation (SQG) in the first step plays the critical role for the final performance. However, most existing studies focus on other components, such as concept detection, multimodal fusion or pseudo relevance feedback. Only few studies address on the problem of how to automatically generate an effective query.

Automatic SQG translates and maps a user query into system query which contains the relevant and discriminative concept names in the system vocabulary used for retrieval. This task is challenging for three reasons: 1) The ambiguous relevance between the query and the concepts, 2) the complex relation between concepts, and 3) the selection of the right concepts for retrieval.

The conventional SQG mapping is based on textual information of external text corpus, such as WordNet, Point-Wise Mutual Information (PMI), and word embedding with external text corpus, which does not exactly represent the correlation of textual-visual data. This scenario is worsened by the ambiguities of the concept names stemmed from the entry level categories, such as the semantic labels people use to train and name concepts—which fails to represent the real and rich semantic meanings of a concept. For example, a "cat" concept detector is trained to retrieve some videos contains cats. However, sometimes it also retrieves videos contains puffy animals such as dog and mice. A simple label for a concept fails to fully represent the richness and diversity of retrieval results.

Semantic concepts share complex relationships such as mutual exclusion, subsumption, and frequent co-occurrence. For example, "cloud" and "sky" frequently co-occur; "dog" subsumes "terrier". Conventional mapping is based on individual terms to individual concept, where the concept relation is not fully considered. For example, a "birthday party" event may consist of "cake", "gift", "kids" concepts. In a specific case using only "kid" and "gift" would be sufficient for the retrieval task.

The selection of a discriminative concept is also less explored. The concept detector sets in the system vocabulary are trained base on heterogeneous external datasets such as Semantic Indexing (SIN), Yahoo Flickr Creative Common (YFCC), and Google Sports. The quality of concepts within the same concept set are different. For instance, the "male" concept may be more accurate than the "police" concept. The accuracy of concept between concept sets should also be considered. For instance, how we evaluate and select the better concept in two same-named concepts (e.g. "car") in SIN and YFCC when searching "car racing" event.

The present system can include scalable "offline" video semantic indexing of such a detection system, as state-of-the art systems are not adequate for this purpose. Further, an automatic SQG system based on a novel semantic concept embedding model is disclosed to resolve the ambiguity and complex relation of concepts automatically and generate an effective and efficient text query to vastly improve accuracy.

Traditional content-based video retrieval methods have demonstrated promising results in a number of large scale applications, such as SIFT matching and near duplicate detection. The search mainly utilizes the low-level descriptors that carry little semantic meaning. On the other hand, semantic video search aims at searching the high-level semantic concepts automatically detected in the video content. Compared with traditional methods, semantic search relies on understanding about the video content. This line of study first emerged in a TRECVID task called Semantic Indexing, the goal of which is to search the occurrence of a single or a pair of concepts. A concept can be regarded as a visual or acoustic semantic tag on people, objects, scenes and actions in the video content.

With the advance in object and action detection, people started to focus on searching more complex queries called events. An event is more complex than a concept as it usually involves people engaged in process-driven actions with other people and/or objects at a specific place and time. For example, the event "rock climbing" involves video clips such as outdoor bouldering, indoor artificial wall climbing or snow mountain climbing. A benchmark task on this topic is called TRECVID Multimedia Event Detection (MED). Its goal is to detect the occurrence of a main event occurring in a video clip without any user-generated metadata. MED is divided into two scenarios in terms of whether example videos are provided. When example videos are given, a state-of-the-art system first train classifiers using multiple features and fuse the decision of the individual classification results.

The present system can use zero-example search (0Ex) where no example videos are given. 0Ex mostly resembles a real world scenario, in which users start the search without any example. As opposed to training an event detector, 0Ex searches semantic concepts that are expected to occur in the relevant videos, e.g. we might look for concepts like "car", "bicycle", "hand" and "tire" for the event "changing a vehicle tire". A few studies have been proposed on this topic. Existing solutions are only for a few thousand videos because they cannot scale to big data collections. Therefore, the biggest collection in existing studies contains no more than 200 thousand videos.

Query Refinement for Video

In text retrieval, the problem of query re-formulation, such as query refinement or expansion, has been studied for many years. For image retrieval, they are also plenty works about query refinement for improving the search results. However, the problem of query formulation in video retrieval has not been thoroughly studied yet, especially for concept-based video retrieval with no exemplar (e.g. 0Ex tasks).

In recent years' TRECVID MED tasks, the general methodology is to index videos with high-level concept detection firstly and then generate effective queries based on the event descriptions for subsequent retrieval process. Many efforts have been made in MED modules such as concept detection, multimodal search result fusion and relevance feedback. Nevertheless, most of existing studies did not reported how to automatically generate the effective semantic queries from the event descriptions. These MED systems mainly rely on human labors to create such crafted queries for each event, which is not scalable and applicable for real applications The present system provides robust, accurate and scalable video content retrieval through text query, suitable zero-example search (0Ex) scenarios. This scalable solution introduces a step, termed herein as concept adjustment, which aims in producing video (and video shot) representations that are consistent with the underlying concept representation. After adjustment, a video is represented by a few salient and consistent concepts that can be efficiently indexed by the inverted index. This adjustment model is a general optimization framework that also can incorporate existing techniques as special cases. In practice, as demonstrated herein, the adjustment increases the consistency with the ground-truth concept representation on the real world TRECVID dataset. Unlike text words, semantic concepts are associated with scores that indicate how confidently they are detected. An extended inverted index structure is proposed that incorporates the real-valued detection scores and supports complex queries with Boolean and temporal operators.

One aspect of the present system extends the current capability of semantic video search by a few orders of magnitude of data while maintaining state-of-the-art accuracy. Importantly, the present system addresses a long-lasting challenge of content-based semantic search in 100 million internet videos on a single core.

In one aspect of the present system, an automatic SQG system was developed based on a novel semantic concept embedding model to automatically generate an effective and efficient text query. The proposed semantic concept embedding utilizes a concept saliency-inverse video frequency (CS-IVF) matrix to investigate the importance of a concept and learns the semantic representation from the human captions in a large scale. The results herein demonstrate this semantic concept embedding model is the first occurrence to confer general and genuine semantic meanings from user captions to the video concepts' trained from heterogeneous datasets.

In the 0Ex retrieval system presented herein, there is an offline stage called video semantic indexing before one can perform any online search. This stage aims at indexing the semantic content in a video for efficient on-line search. As illustrated in process 250 in FIG. 3, there are four major components in this video semantic indexing pipeline, namely, low-level feature extraction, concept detection, concept adjustment (as first proposed herein) and inverted indexing.

A video clip is first represented by low-level visual or audio features. Common features include dense trajectories, deep learning and Mel-frequency cepstral coefficients (hereinafter "MFCCs"). MFCCs are coefficients that collectively make up an MFC. They are derived from a type of cepstral representation of the audio clip (a nonlinear "spectrum-of-a-spectrum"). The low-level features are then fed into the off-the-shelf detectors to extract the semantic concept features, where each dimension corresponds to a confidence score of detecting a semantic (audio and visual) concept in a video shot. The dimensionality is equal to the number of unique detectors in the system. The semantic concept is a type of high-level feature that can be used in search. The high-level features also include Automatic Speech Recognition (ASR) and Optical Character Recognition (OCR).

Figure 3:
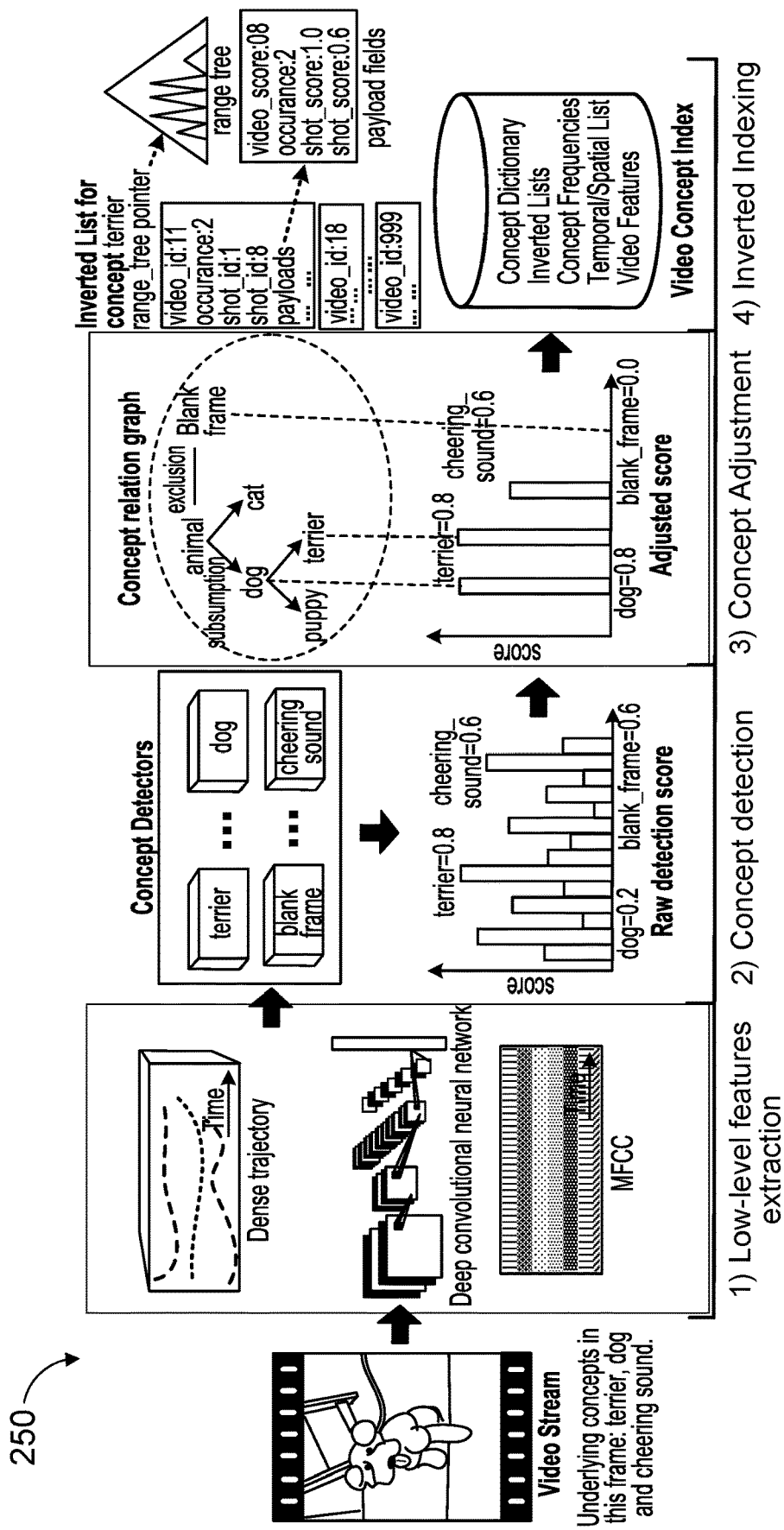
FIG. 3 presents a conceptual view of the offline stage aspect of the present invention.

Indeed, the raw concept detection scores are inappropriate for indexing for two reasons: distributional inconsistency and logical inconsistency. The distributional inconsistency means that the distribution of the raw detection score is inconsistent with the underlying concept distribution of the video. The underlying concept representation tends to be sparse but the distribution of the detection score is dense, i.e. a video contains every concept. Indexing the dense representation by either dense matrices or inverted indexes is known to be inefficient. For example, FIG. 3 illustrates an example in which the raw concept detection contains 14 non-zero scores but there are only three concepts in the underlying representation: "dog", "terrier", and "cheering sound". As we see, the dense distribution of the raw detection score is very different from the underlying distribution.

The logical inconsistency means that the detection scores are not consistent with the semantic relation between concepts, e.g. a video contains a "terrier" but not a "dog". This type of inconsistency results from that 1) the detectors are usually trained by different people using different data, features and models. It is less likely for them to consider the concept consistency that is not in their vocabulary; 2) even within a concept vocabulary, many classification models cannot capture complex relation between concepts. The inconsistent representation can lead to inaccurate search results if not properly handled. For example, in FIG. 3, the score of "dog" 0.2 is less than the score of "terrier" 0.8; the frame is detected as "blank frame", which means an empty frame, and a "terrier".

To address the problem of distributional and logical inconsistencies, the present invention introduces a concept adjustment step. This step aims at generating consistent concept representations that can be efficiently indexed and searched. An adjustment method based on the recently proposed label relation graph is proposed that models the hierarchy and exclusion relation between concepts (see Step 3 in FIG. 3). After adjustment, a video is represented by a few salient concepts, which can be efficiently indexed by the inverted index. In addition, the adjusted representation is logically consistent with the complex relation between concepts.

An effective approach is to index the adjusted representation by the inverted index in text retrieval. However, unlike text words, semantic concepts are associated with scores that indicate how confidently they are detected. The detection score cannot be directly indexed by the standard inverted index. As a result, the scores are usually indexed by dense matrices in existing methods. To this end, the inverted index structure is modified so that it can index the real-valued adjusted score. The modified index contains inverted indexes, frequency lists that store the concept statistics used in the retrieval model, temporal lists that contain the shot information, and video feature lists that store the low-level features. The extended index structure is compatible to existing text retrieval algorithms.

Concept Adjustment Model

No assumptions are made on the training process of the off-the-shelf concept detectors. The detectors may be trained by any type of features, models or data. The assumption is relaxed that detectors are "re-trainable" by particular training algorithms because this is usually impossible when we do not have access to the training data, the code or the computational recourses. Concept adjustment aims at generating video (or video shot) representations that tend to be consistent to the underlying concept representation and meanwhile can be searched efficiently. An ideal video representation tends to be similar to the underlying concept representation in terms of the distributional and logical consistency. To this end, an optimization model to find consistent video representations of the given raw concept detection output is proposed. Formally, let $D \in \mathbb{R}^{n \times m}$ denote the raw scores outputted by the concept detectors, where the row represents the n shots in a video, and the column represents the m visual/audio concepts. The prediction score of each concept is in the range between 0 and 1, i.e. $\forall i, j$, $D_{ij} \in [0, 1]$. We are interested in obtaining a consistent representation $v \in \mathbb{R}^{m \times 1}$, which can be obtained by solving the following optimization problem:

$$\underset{v \in [0,1]^m}{\operatorname{argmin}} \frac{1}{2} \|v - f_p(D)\|_2^2 + g(v; \alpha, \beta) \quad (1)$$

subject to $Av \leq c$ where $$f_p(D) = \left(1 - \left(\frac{m-1}{m}\right)^p\right) (\|d_1\|_p, \ldots, \|d_m\|_p)^T \quad (2)$$

and $$D = \begin{bmatrix} | & & | \\ d_1 & \ldots & d_m \\ | & & | \end{bmatrix}.$$

Each element of $f_p(D)$ is the

Each element of $f_p(D)$ is the p-norm of the column vector of D. $g(v; \alpha, \beta)$ is a regularizer of v with the parameters $\alpha$ and $\beta$. Variables A and c are a constant matrix and a constant vector, respectively, which model the logical consistencies and will be discussed in Section 4.1.2. It is easy to verify that when $p=\infty$ and $p=1$, the operator $f_p(D)$ corresponds to the max and the average pooling operator. Usually $g(\cdot)$ is convex, and thus Eq. (1) can be conveniently solved by the standard convex programming toolbox. The raw prediction score may diminish during the concept adjustment. It is usually helpful to normalize the optimal value of $v=[v_1, \ldots, v_m]$ by:

$$\hat{v}_i = \min\left(1, \frac{v_i}{\sum_{j=1}^{m} v_j} \sum_{j=1}^{m} f_p(D)_j I(v_j)\right), \quad (3)$$

where $I(v_j)$ is an indicator function equaling 1 when $v_j > 0$, and 0 otherwise. Here we define $0/0 = 0$.

In order to obtain the shot-level adjusted representation, we can treat a shot as a "video" and let D be a single row matrix containing the detection score of the shot. Eq. (1) can be used but with an extra integer set in the constraints.

Distributional Consistency

For the distributional consistency, a regularization term $g(v; \alpha, \beta)$ is introduced that produces sparse representations while taking into account that certain concepts may co-occur together. A naive implementation is to use the l0 norm:

$$g(v; \alpha, \beta) = \frac{1}{2} \beta^2 \|v\|_0. \quad (4)$$

This regularization term presents a formidable computational challenge. In this paper we propose a more feasible and general regularization term. Suppose the concepts are divided into q non-overlapping groups. A group may contain a number of co-occurring concepts, or a single concept if it does not co-occur with others. Such sparsity and group sparsity information can be encoded into the model by adding a convex regularization term $g(v)$ of the l1 norm and the sum of group-wise l2 norm of v:

$$g(v; \alpha, \beta) = \alpha \beta \|v\|_1 + (1-\alpha) \sum_{l=1}^{g} \beta \sqrt{p_l} \|v^{(l)}\|_2, \quad (5)$$

where $v(l) \in \mathbb{R}^{p_l}$ is the coefficient for the l-th group where $p_l$ is the length of that group. $\alpha \in [0, 1]$ and $\beta$ are two parameters controlling the magnitude of the sparsity.

The parameter $\alpha$ balances the group-wise and the within-group sparsity. When $\alpha=1$, $g(v)$ becomes lasso that finds a solution with few nonzero entries. When $\alpha=0$, $g(v)$ becomes group lasso, that only yields nonzero entries in a sparse set of groups. If a group is included then all coefficients in the group will be nonzero. Sometimes, the sparsity within a group is needed, i.e. if a group is included, only few coefficients in the group will be nonzero. This is known as sparse-group lasso that linearly interpolates lasso and group lasso by the parameter $\alpha$.

In the context of semantic concepts, lasso is an approximation to the corresponding l0 norm regularization problem which is computationally expensive to solve. Lasso is an approximation to the corresponding l0 norm term assume the concepts are independent, and works well when the assumption is satisfied, e.g. the 1,000 concepts in ImageNet challenges where the concepts are manually selected to be exclusive labels. On the other hand, Group lasso assumes that there exist groups of concepts tend to be present or absent together frequently, e.g. "sky/cloud", "beach/ocean/waterfront" and "table/chair". The group may also include multimodal concepts such as "baby/baby noises". Since co-occurring concepts may not always be present together, the within-group sparse solution is sometimes needed, i.e.

only few concepts in a group are nonzero. This can be satisfied by sparse-group lasso that makes weaker assumptions about the underlying concept distribution.

Logistical Consistency

The concept relation is modeled by Hierarchy and Exclusion (HEX) graph. The idea is to infer a representation that maximizes the likelihood and do not violate the label relation defined in the HEX graph. A HEX graph is defined as follows.

Definition 1:

A HEX graph $G=(N, E_h, E_e)$ is a graph consisting of a set of nodes $N=\{n_1, \ldots, n_m\}$, directed edges $E_h \subseteq N \times N$ and undirected edges $E_e \subseteq N \times N$ such that the subgraph $G_h=(N, E_h)$ is a directed acyclic graph and the subgraph $G_e=(N, E_e)$ has no self-loop. Each node in the graph represents a distinct concept. A hierarchy edge $(n_i, n_j) \in E_h$ indicates that concept $n_i$ subsumes concept $n_j$ in the concept hierarchy, e.g. "dog" is a parent of "puppy". An exclusion edge $(n_i, n_j) \in E_e$ indicates concept $n_i$ and $n_j$ are mutually exclusive, e.g. a frame can-not be both "blank frame" and "dog". Based on Definition 1, we define the logically consistent representation as:

Definition 2.

$v=[v_1, \ldots, v_m]$ is a vector of concept detection scores. The $i^{th}$ dimension corresponds to the concept node $n_i \in N$ in the HEX graph G. $v \in [0, 1]^m$ is logically consistent with G if for any pair of concepts $(n_i, n_j)$:
1. if $n_i \in \alpha(nj)$, then $v_i \geq v_j$;
2. if $\exists n_p \in \bar{a}(ni), \exists n_q \in \bar{a}(n_j)$ and $(n_p, n_q) \in E_e$, then we have $v_i v_j = 0$;

where $\alpha(n_i)$ is a set of all ancestors of $n_i$ in $G_h$, and $\bar{a}(n_i) = \alpha(ni) \cup n_i$.

Definition 2 indicates that a logically consistent representation should not violate any concept relation defined in its HEX graph G. This definition generalizes the legal assignments to allow concepts taking real values. We model the logical consistency by the affine constraints $Av \leq c$. The constant matrix A and vector c can be calculated from Algorithm 1. For each edge in the graph, Algorithm 1 defines a constraint on values the two concepts can take. A hierarchy edge $(n_i, n_j) \in E_h$ means that the value of a parent is no less than the value of its children, e.g. "puppy=0.8" but "dog=0.2" is inconsistent. For each exclusion edge, Algorithm 1 introduces an affine constraint $v_i + v_j = 1$ and $v_i, v_j \in \{0, 1\}$ to avoid the case where two concepts both have nonzero values. Note that the solution of the exclusion constraint complies with the binary legal assignments that for any $(n_i, n_j) \in E_e$, $(v_i, v_j)/=(1, 1)$. It is unnecessary to propagate an exclusion constraint to its children nodes because the hierarchy constraint guarantees the score of the children nodes is no more than their parent. According to Definition 2, it is easy to prove that the optimal solution of Eq. (1) is logically consistent with a given HEX graph. The problem with integer constraints can be solved either by the mixed-integer convex programming toolbox, or by the constraint relaxation.

Theorem 1. The optimal solutions of Eq. (1) (before or after normalization) is logically consistent with its given HEX graph.

---

Algorithm 1: Constraints for logical consistency.

input : A HEX graph $G = (V, E_h, E_e)$
output: A contant matrix A and a constant c.
1  n = |$E_h$| + |$E_e$|; m = |V|; k = 0;
2  A = $0_{n \times m}$, c = $0_{n \times 1}$;

---

-continued

Algorithm 1: Constraints for logical consistency.

3   foreach $(n_i, n_j) \in E_h$ do
4   |   $A_{ki} = -1; A_{kj} = 1; c_k = 0$;
5   |   k++;
6   end
7   Define an integer constraint set I ← φ;
8   foreach $(n_i, n_j) \in E_e$ do
9   |   $A_{ki} = 1; A_{kj} = 1; c_k = 1$;
10  |   add $n_i, n_j$ to I;
11  |   k++;
12  end
13  return A, c, I;

---

The proposed model can produce a representation that tends to be both distributionally and logically consistent to the underlying concept representation. A nice property of the model in Eq. (1) is that it degenerates to several existing methods. For example, it is easy to verify that the max and the average pooling results are also optimal solutions of Eq. (1) in special cases. Theorem 1 indicates that the optimal solution of adjusted representations complies with the logical consistency definition. Theorem 2 indicates that the thresholding and the top-k thresholding results are optimal solutions of Eq. (1). The thresholding method preserves s-cores only above some threshold. In some cases, instead of using an absolute threshold, one can alternatively set the threshold in terms of the number of concepts to be included. This is known as the top-k thresholding. The proof is provided in the supplementary materials.

Theorem 2. The thresholding and the top-k thresholding results are optimal solutions of Eq. (1) in special cases:

The proposed model also provides common interpretations of what are being optimized. The physical meaning of the optimization problem in Eq. (1) can be interpreted in a maximum a priori model. The interpretation is provided in the supplementary materials.

The choice of the proposed model parameters depends on the underlying distribution of the semantic concepts. For the manually exclusive concepts, such as the 1,000 concepts in the ImageNet challenge, the 10 norm or the 11 norm without any HEX constraint should work reasonably well. In addition, as the model is simple, the problem can be efficiently solved by the closed-form solution. When the concepts are of concrete hierarchical or exclusion relations, such as the concepts in TRECVID SIN, incorporating the HEX constraint tends to be beneficial. The group-lasso and the sparse-group lasso play a role when groups of concepts tend to co-occur together frequently. It can be important for the multimodal concept detectors that capture the same concept by multiple features, e.g. audio or visual. An approach to derive the co-occurring concepts is by clustering the concepts in their labeled training data. We observed big clusters tend to include more loosely coupled concepts, e.g. sky/cloud is a good group but sky/cloud/helicopter is not. To be prudent, we recommend limiting the group size in clustering.

Note the exclusion relation between concepts only makes sense at the shot-level adjustment. Solving a mixed integer convex programming problem takes more time than solving a regular convex programming problem. So it might be useful to use some type of constraint relaxation techniques. Besides, in the current model, we assume the concept detectors are equally accurate. A simple yet effective extension to embed this information by discounting the squared loss of inaccurate concepts in Eq. (1).

Inverted Indexing and Search

The dense raw detection scores are usually indexed by dense matrices. This simple solution, though preserves all detection scores, is not scalable. In comparison, the proposed adjustment method represents a video by a few salient and consistent concepts. To index the adjusted representation, the structure of the inverted index is modified so that it can incorporate real-valued detection scores. In this section, we discuss video indexing and search, using the proposed inverted indexes.

Inverted Indexing.

After adjustment, a video is represented by a few salient and consistent concepts. In analogy to words in a text document, concepts can be treated as "words" in a video. Unlike text words, concepts are associated with scores that indicate how confidently they are detected. The real-valued scores are difficult to be directly indexed in the standard inverted index designed for text words. A naive approach is by binning, where we assign real values to the bins representing the segment covering the numerical value. The concepts are duplicated by the number of its filled bins. However, this solution creates hallucinating concepts in the index, and cannot store the shot-level concept scores.

To solve the problem in a more principled way, we propose a modified inverted index to incorporate the real-valued detection scores. In text retrieval, each unique text word has a list of postings in the inverted index. A posting contains a document ID, the term frequency, and the term positions in the document. The term frequency is used in the retrieval model, and the position information is used in the proximity search. Inspired by this structure, in our system, the concept with a nonzero score in the adjusted representation is indexed to represent a video. Each unique concept has a list of video postings and a range search tree. An example index structure is illustrated in Step 4 in FIG. 3. A video posting contains a video ID, the number of concept occurrence in the video, a video-level detection score, and a list of video shots in which the concept occurs. It also has a payload to store the real-valued detection score for each shot. The query that searches for the video-level score of a certain range can be handled by the range tree, e.g. "videos that contain dog >0.5"; the query that searches for the shot-level score can be handled by the payload in the posting, e.g. "shots that contain dog >0.5"; otherwise, the query can be processed in a similar way as in text retrieval, e.g. videos that contain "dog AND cat".

A search usually contains two steps: retrieving a list of video postings and ranking the postings according to some retrieval model. In our system, we consider the following query operators to retrieve a video posting list:

Modality query: Searching a query term in a specified modality. For example, "visual:dog" returns the videos that contain the visual concept "dog"; "visual:dog/[score s1, s2]" returns the videos that have a detection score of "dog" between s1 and s2. "visual" is the default modality. The other modalities are "ASR" for automatically recognized speech, "OCR" for recognized optical characters, and "audio" for audio concepts.

Temporal query: Searching query terms that have constraints on their temporal occurrences in a video. The constraints can be specified in terms of the absolute timestamp like "videos that contain dog between the time t1 and t2", the relative sequence like "videos in which dog is seen before cat", or the proximity relations like "videos that contain dog and cat within the time window of t1".

Boolean query: Multiple terms can be combined together with Boolean operators to form a more complex query. Our system supports three operators: "AND", "OR" and "AND NOT", where the "OR" operator is the default conjunction operator.

A Boolean query can be handled by the standard algorithms in text retrieval, as Theorem 1 guarantees that the adjusted representation is logically consistent. However, the query may be accelerated by utilizing the concept relation in the HEX graph. For example, it is unnecessary to run a query to realize that ("dog" AND "animal")="dog". Suppose the query is expressed in the disjunctive normal form. Given a HEX graph G and two concepts $n_i$, $n_j \in V$, for each term in the disjunction normal form, we apply: $(n_i \text{AND } nj) = n_i$ if $n_j \in \alpha$ $(n_i)$ is the set of all ancestors of $n_i$ in $G_h$; $(n_i \text{ AND NOT } n_j) = \emptyset$ if $\exists n_p \in \bar{a}(n_i)$, $\exists n_q \in \bar{a}(n_j)$ and $(n_p, n_q) \in E_e$. The simplified query can be then used to retrieve the video postings. A temporal query can be handled in a similar fashion as the proximity search in text retrieval.

After retrieving a video posting list, the next step is to rank the postings according to some retrieval model. A retrieval model can have substantial impact on the performance. The Okapi BM25 model works reasonably well for concept retrieval. Suppose the input query is $Q = q_1, \ldots, q_n$, the model ranks a video d by:

$$s(d \mid Q) = \sum_{i=1}^{n} \log \frac{|C| - df(q_i) + \frac{1}{2}}{df(q_i) + \frac{1}{2}} \frac{tf(q_i, d)(k_1 + 1)}{tf(q_i, d) + k_1\left(1 - b + b\frac{len(d)}{len}\right)}, \quad (6)$$

where |C| is the total number of videos. tf ($q_i$, d) returns the score of the concept qi in the adjusted representation of video d. df (·) calculates the sum of adjusted score of qi in the video collection. len(d) calculates the sum of adjusted scores for video d, and len is the average length across all videos. $k_1$ and b are two parameters to tune. Note the statistics are calculated by the adjusted concept score rather than the raw detection score. The statistics used in retrieval are stored in the index and can be accessed efficiently.

The experiments are conducted on two TRECVID benchmarks called Multimedia Event Detection (MED): MED13Test and MED14Test. The performance is evaluated by several metrics for a better understanding, which include: P@20, Mean Reciprocal Rank (MRR), Mean Average Precision (MAP), and MAP@20, where the MAP is the official metric used by NIST. Each set includes 20 events over 25,000 test videos. The official NIST's test split is used. We also evaluate each experiment on 10 randomly generated splits to reduce the split partition bias. All experiments are conducted without using any example or text metadata.

Videos are indexed by high-level features including semantic concepts, Automatic Speech Recognition (ASR), and Optical Character Recognition (OCR). For semantic concepts, 1,000 ImageNet concepts are trained by the deep convolution neural networks. The remaining 3,000+ concepts are directly trained on videos by the self-paced learning pipeline on around 2 million videos using improved dense trajectories. The video datasets include Sports, Yahoo Flickr Creative Common (YFCC100M), Internet Archive Creative Common (IACC) and Do It Yourself (DIY). The details of these datasets can be found in Table 1. The ASR module is built on Kaldi. OCR is extracted by a commercial toolkit. Three sets of queries are used: 1) Expert queries are obtained by human experts; 2) Auto queries are automatically generated by the Semantic Query Generation (SQG) methods using ASR, OCR and visual concepts; 3) AutoVisual queries are also automatically generated but only includes the visual concepts. The Expert queries are used by default.

TABLE 1

Summary of the semantic concept training sets. ImageNet features are trained on still images, and the rest are trained on videos.

| Dataset | #Samples | #Classes | Category | Example Concepts |
|---|---|---|---|---|
| DIY | 72,000 | 1,601 | Instructional videos | Yoga, Juggling, Cooking |
| IACC | 600,000 | 346 | Internet archive videos | Baby, Outdoor, Sitting down |
| YFCC100M | 800,000 | 609 | Amateur videos on Flickr | Beach, Snow, Dancing |
| ImageNet | 1,000,000 | 1000 | Still images | Bee, Corkscrew, Cloak |
| Sports | 1,100,000 | 487 | Sports videos on YouTube | Bullfighting, Cycling, Skiing |

The concept relation released by NIST is used to build the HEX graph for IACC features. The adjustment is conducted at the video-level average pooling feature (p=1 in Eq. (1)). For other concept features, since there is no public concept relation specification, we manually create the HEX graph. The HEX graphs are empty for Sports and ImageNet features as there is no evident hierarchical and exclusion relation in their concepts. We cluster the concepts based on the correlation of their training labels, and include concepts that are frequently co-occurred together into a group. The parameters are tuned on a validation sets, and then are fixed across all experiment datasets including MED13Test, MED14Test and YFCC100M. Specifically, the default parameters in Eq. (1) are p=1, α=0.95. β is set as the top k detection scores in a video, and is different for each type of features: 60 for IACC, 10 for Sports, 50 for YFCC100M, 15 for ImageNet, and 10 for DIY features. CVX optimization toolbox is used to solve the model in Eq. (1). Eq. (6) is used as the retrieval model for concept features, where k1=1.2 and b=0.75.

Table 2 lists the evaluation metrics over the two benchmarks on the standard NIST split and on the 10 randomly generated splits. The performance is reported over three set of queries: Expert, Auto, and AutoVisual.

Figure 4:
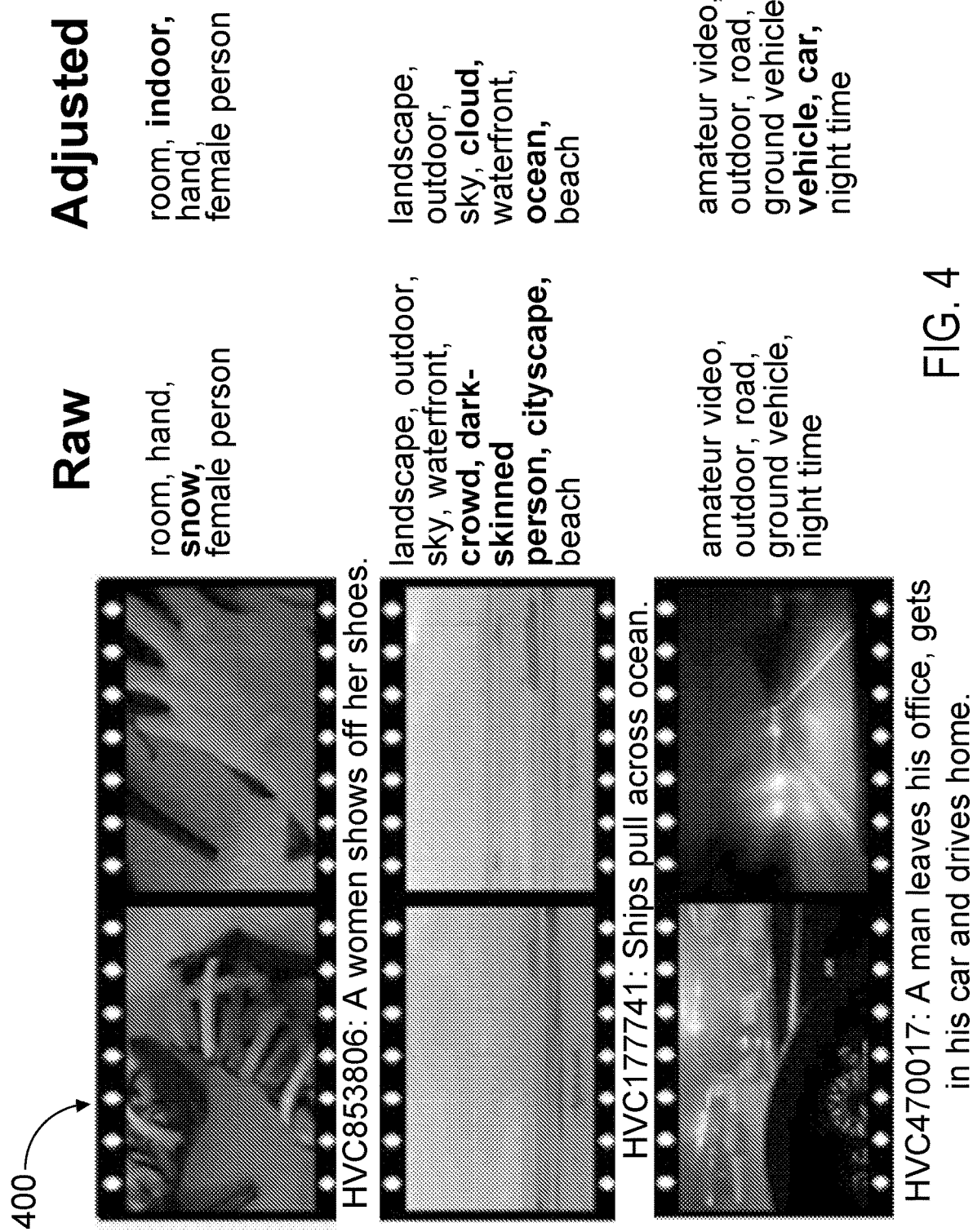
FIG. 4 shows the comparison of raw and adjusted concepts.

Table 3 compares the performance of the raw and the adjusted representation on the 10 splits of MED13Test. Raw lists the performance of indexing the raw score by dense matrices; Adjusted lists the performance of indexing the adjusted concepts by the proposed index which preserves the real-valued scores. As we see, although Raw is slightly better than Adjusted, its index in the form of dense matrices is more than 33 times bigger than the inverted index in Adjusted. The comparison substantiates that the adjusted representation has comparable performances with the raw representation but can be indexed by a much smaller index. An interesting observation is that Adjusted outperforms Raw on 8 out of 20 events on MED13Test (see the supplementary materials). We inspected the results and found that concept adjustment can generate more consistent representations. The diagram 400 of FIG. 4 illustrates raw and adjusted concepts on three example videos. Since the raw score is dense, we only list the top ranked concepts. As we see, the noisy concept in the raw detection may be removed by the logical consistency, e.g. "snow" in the first video. The missed concept may be recalled by logical consistencies, e.g. "vehicle" in the third video is recalled by "ground vehicle". The frequently co-occurring concepts may also be recovered by distributional consistencies, e.g. "cloud" and "sky" in the second video. Besides, we also found that Boolean queries can boost the performance. For example, in "E029: Winning a race without a vehicle", the query of relevant concepts such as swimming, racing or marathon can achieve an AP of 12.5. However, the Boolean query also containing "AND NOT" concepts such as car racing or horse riding can achieve an AP of 24.5. We then compare our best result with the published results on MED13Test. The experiments are all conducted on the NIST's split, and thus are comparable to each other. As we see in Table 4, the proposed method has a comparable performance to the state-of-the-art methods. Notably, the proposed method with one iteration of re-ranking is able to achieve the best result. The comparison substantiates that our method maintains state-of-the-art accuracy. It is worth emphasizing that the baseline methods may not scale to big data sets, as the dense matrices are used to index all raw detection scores.

TABLE 2

Overview of the system performance.

| | | Evaluation Metric | | | |
|---|---|---|---|---|---|
| Dataset | Query | P@20 | MRR | MAP@20 | MAP |
| (a) Performance on the NIST's split | | | | | |
| MED13Test | Expert | 0.355 | 0.693 | 0.280 | 0.183 |
| | Auto | 0.243 | 0.601 | 0.177 | 0.118 |
| | AutoVisual | 0.125 | 0.270 | 0.067 | 0.074 |
| MED14Test | Expert | 0.228 | 0.585 | 0.147 | 0.172 |
| | Auto | 0.150 | 0.431 | 0.102 | 0.100 |
| | AutoVisual | 0.120 | 0.372 | 0.067 | 0.086 |
| (b) Average Performance on the 10 splits | | | | | |
| MED13Test | Expert | 0.325 | 0.689 | 0.247 | 0.172 |
| | Auto | 0.253 | 0.592 | 0.187 | 0.120 |
| | AutoVisual | 0.126 | 0.252 | 0.069 | 0.074 |
| MED14Test | Expert | 0.219 | 0.540 | 0.144 | 0.171 |
| | Auto | 0.148 | 0.417 | 0.084 | 0.102 |
| | AutoVisual | 0.117 | 0.350 | 0.063 | 0.084 |

TABLE 3

Comparison of the raw and the adjusted representation on the 10 splits.

| | | Evaluation Metric | | | |
|---|---|---|---|---|---|
| Method | Index | P@20 | MRR | MAP@20 | MAP |
| MED13 Raw | 385M | 0.312 | 0.728 | 0.230 | 0.176 |
| MED13 Adjusted | 11.6M | 0.325 | 0.689 | 0.247 | 0.172 |
| MED14 Raw | 357M | 0.233 | 0.610 | 0.155 | 0.185 |
| MED14 Adjusted | 12M | 0.219 | 0.540 | 0.144 | 0.171 |

TABLE 4

MAP (×100) comparison with the
published results on MED13Test.

| Method | Year | MAP |
| --- | --- | --- |
| Composite Concepts [9] | 2014 | 6.4 |
| Tag Propagation [22] | 2014 | 9.6 |
| MMPRF [17] | 2014 | 10.1 |
| Clauses [21] | 2014 | 11.2 |
| Multi-modal Fusion [42] | 2014 | 12.6 |
| SPaR [14] | 2014 | 12.9 |
| E-Lamp FullSys [18] | 2015 | 20.7 |
| Our System | 2015 | 18.3 |
| Our System + reranking | 2015 | 20.8 |

Figure 5:
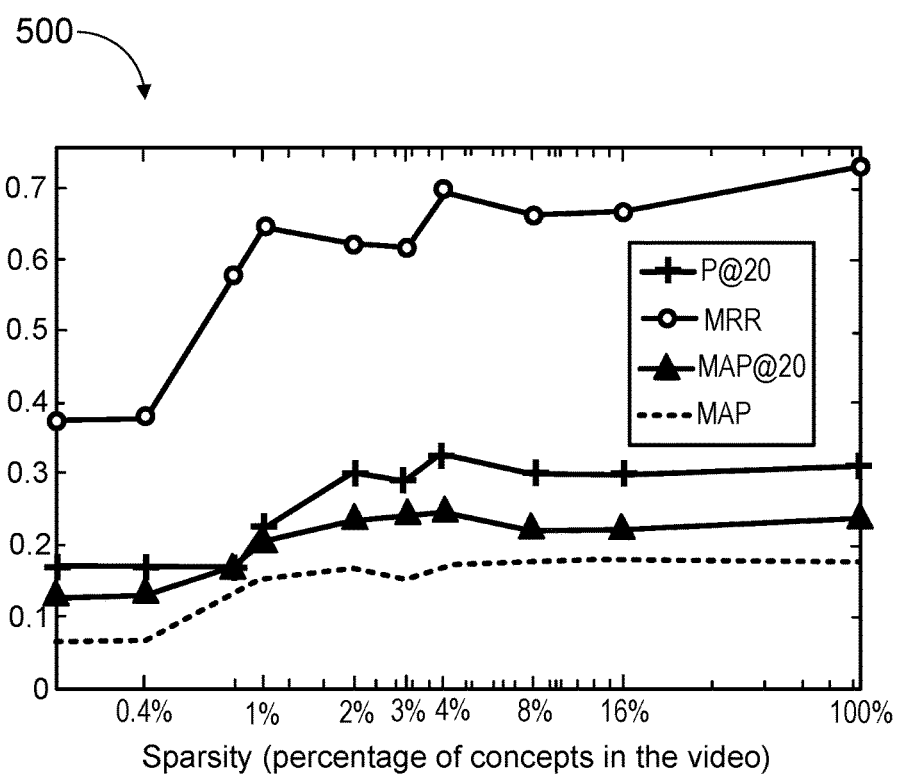
FIG. 5 shows a graph.

The parameters $\alpha$ and $\beta$ in Eq. (1) control the magnitude of sparsity in the concept adjustment, i.e. the percentage of concepts with nonzero scores in a video representation. A sparse representation reduces the size of indexes but hurts the performance at the same time. As we will see later, $\beta$ is more important than $\alpha$ in affecting the performance. Therefore, we fix $\alpha$ to 0.95 and study the impact of $\beta$. Graph 500 of FIG. 5 illustrates the tradeoff between accuracy and efficiency on the 10 splits of MED13Test. By tuning $\beta$, we obtain different percentages of nonzero concepts in a video representation. The x-axis lists the percentage in the log scale. x=0 indicates the performance of ASR and OCR without semantic concept features. We discovered that we do not need many concepts to index a video, and a few adjusted concepts already preserve significant amount of information for search. As we see, the best tradeoff in this problem is 4% of the total concepts (i.e. 163 concepts).

Generally, the comparison in terms of retrieval performance depends on the query words. A query-independent way to verify the accuracy of the adjusted concept representation is by comparing it to the ground truth representation. To this end, we conduct experiments on the TRECVID Semantic Indexing (SIN) IACC set, where the manually labeled concepts are available for each shot in a video. We use our detectors to extract the raw shot-level detection score, and then apply the adjustment methods in Section 4 to obtain the adjusted representation. The performance is evaluated by Root Mean Squared Error (RMSE) to the ground truth concepts for the 1,500 test shots in 961 videos.

We compare the adjustment method herein with the baseline methods in Table 5, where HEX Graph indicates the logical consistent representation on the raw detection scores (i.e. $\beta$=0), and Group Lasso denotes the representation yield by Eq. (5) when $\alpha$=0. We tune the parameter in each baseline method and report its best performance. As the ground truth label is binary, we let the adjusted scores be binary in all methods. As we see, the proposed method outperforms all baseline methods. We hypothesize the reason is that our method is the only one that combines the distributional consistency and the logical consistency. As discussed earlier, the baseline methods can be regarded as special cases of the proposed model.

TABLE 5

Comparison of the adjusted representation and
baseline methods on the TRECVID SIN set. The
metric is Root Mean Squared Error (RMSE).

| Method | RMSE |
| --- | --- |
| Raw Score | 7.671 |
| HEX Graph Only | 8.090 |
| Thresholding | 1.349 |
| Top-k Thresholding | 1.624 |
| Group Lasso | 1.570 |
| Our method | 1.236 |

Figure 6A:
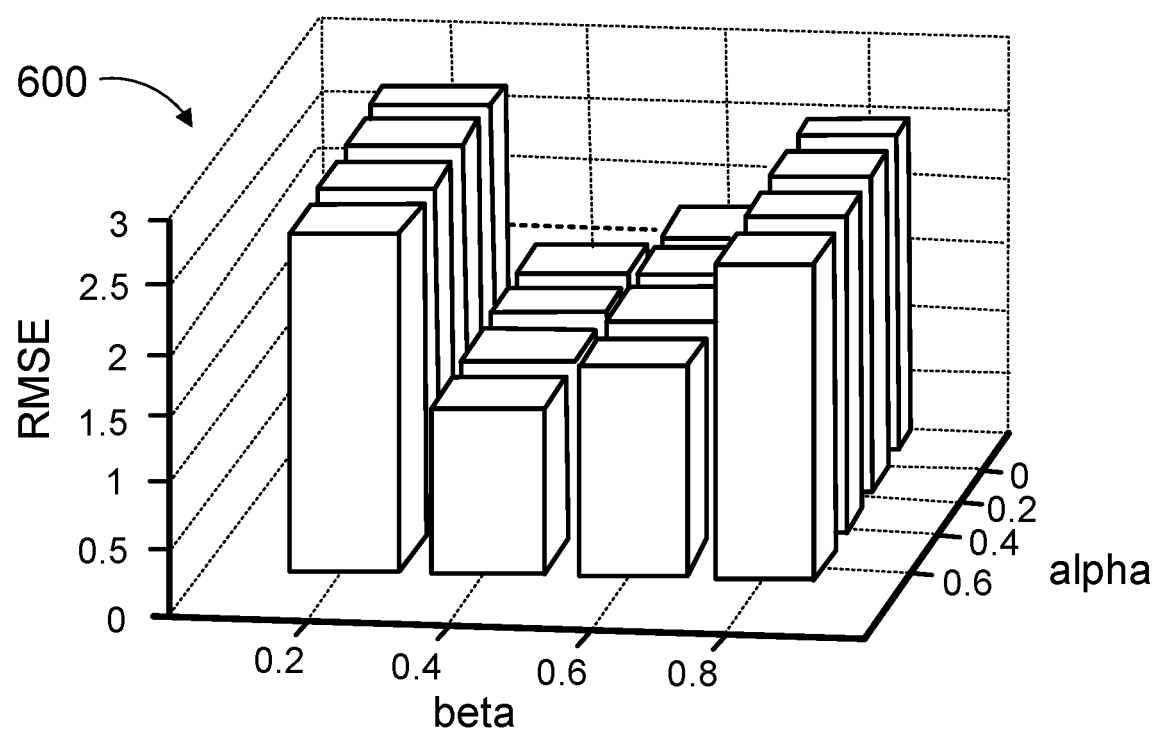
FIG. 6 represents the sensitivity study on the parameter $\alpha$ and $\beta$ in the model.
Figure 6B:
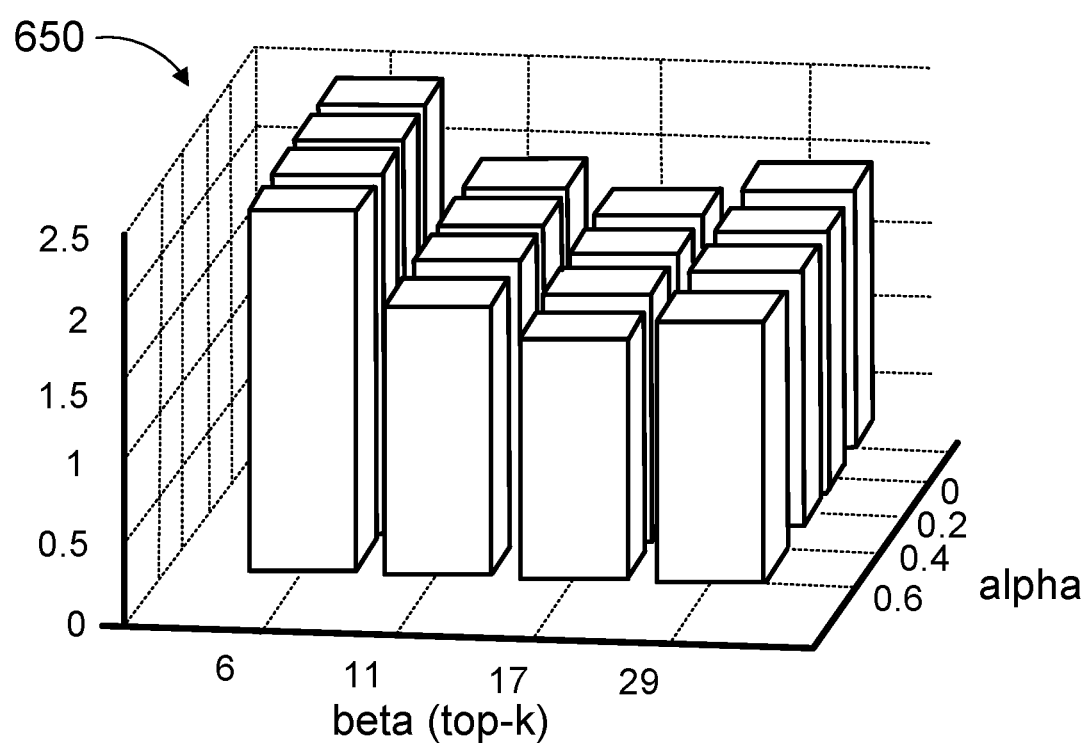

The parameter sensitivity in the proposed model was studied. FIG. 6 plots the RMSE under different parameter settings, as shown in plots 600 and 650. Physically, $\alpha$ interpolates the group-wise and within-group sparsity and $\beta$ determines the number of concepts in a video.

Indeed, the parameter $\beta$ is more sensitive than $\alpha$, and accordingly we fix the value of $\alpha$ in practice. Note that the parameter $\beta$ is also an important parameter in the baseline methods including thresholding and top-k thresholding.

The largest public multimedia collection that has ever been released, YFCC100M, was analyzed using one embodiment of the proposed method. It contains about 0.8 million Internet videos (10 million shots) on Flickr. For each video and video shot, the improved dense trajectory was extracted, and 3,000+ concepts were detected by the off-the-shelf detectors in Table 1. The inverted index was implemented, and a similar configuration described herein is used except we set b=0 in the BM25 model. All experiments are conducted without using any example or text metadata. It is worth emphasizing that as the dataset is very big. The offline video indexing process costs considerable amount of computational resources in Pittsburgh super-computing center.

Figure 7A:
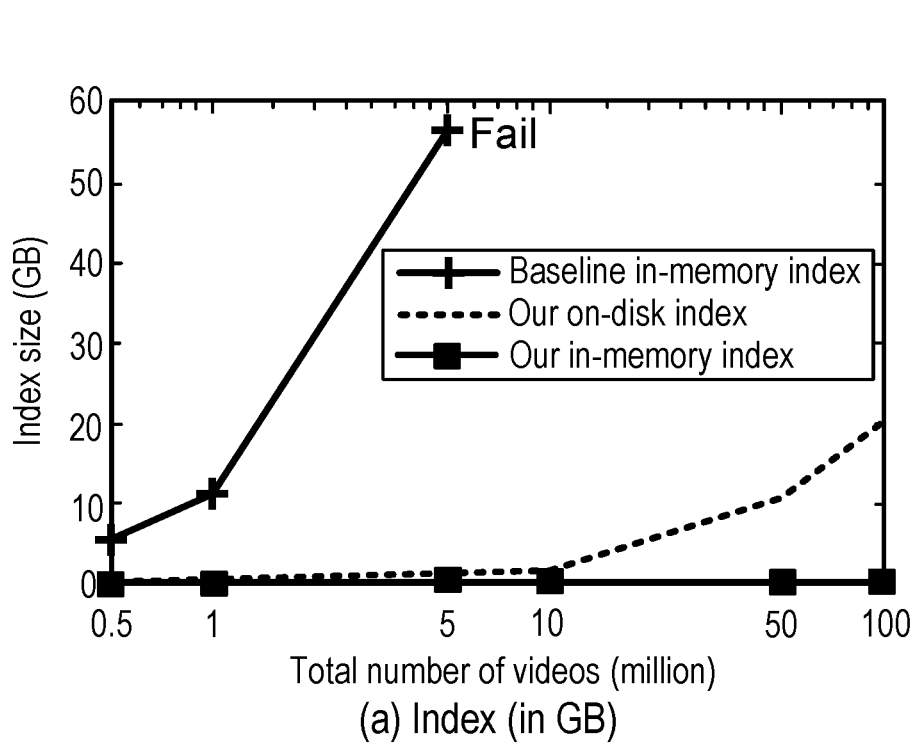
FIGS. 7A-7B are plots to demonstrate the scalability and efficiency from the test on 100 million videos.
Figure 7B:
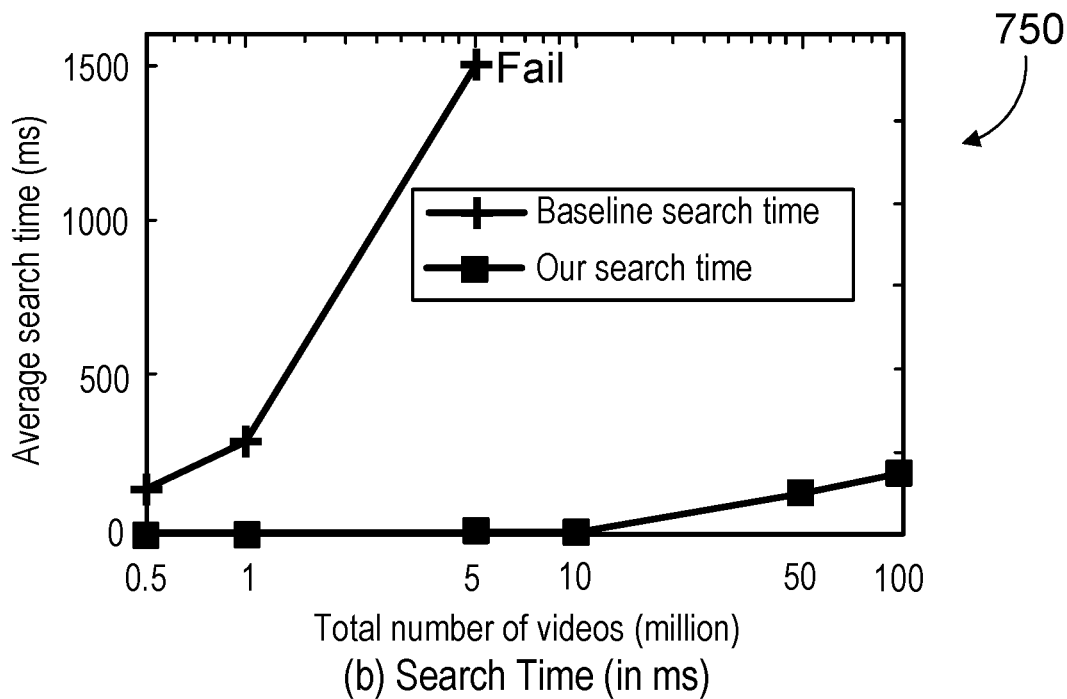

To validate the efficiency and scalability, the original video shots were duplicated, and we create an artificial set of 100 million videos. The search performance of the proposed method was compared to a common approach in existing studies that indexes the video by dense matrices. The experiments were conducted on a single core of Intel Xeon 2.53 GHz CPU with 64 GB memory. The performance is evaluated in terms of the memory consumption and the online search efficiency. Graph 700 of FIG. 7(*a*) compares the in-memory index as the data size grows, where the x-axis denotes the number of videos in the log scale, and the y-axis measures the index in GB. As we see, the baseline method fails when the data reaches 5 million due to lack of memory. In contrast, our method is scalable and only needs 550 MB memory to search 100 million videos. The size of the total inverted index on disk is only 20 GB. Graph 750 of FIG. 7(*b*) compares the online search speed. We create 5 queries, run each query 100 times, and report the mean runtime in milliseconds. A similar pattern can be observed in FIGS. 7(*a*), 7(*b*) that our method is much more efficient than the baseline method and only costs 191 ms to process a query on a single core. The above results verify scalability and efficiency of the proposed method.

As a demonstration, the system was used to find relevant videos for commercials. The search is on 0.8 Million Internet videos. We download 30 commercials from the Internet, and manually create 30 semantic queries only using semantic visual concepts. We evaluate the top 20 videos returned by our system and summarize the results in Table 6, below.

TABLE 6

Average performance for 30 commercials on the YFCC100M set.

| Category | #Ads | Evaluation Metric | | |
|---|---|---|---|---|
| | | P@20 | MRR | MAP@20 |
| Sports | 7 | 0.88 | 1.00 | 0.94 |
| Auto | 2 | 0.85 | 1.00 | 0.95 |
| Grocery | 8 | 0.84 | 0.93 | 0.88 |
| Traveling | 3 | 0.96 | 1.00 | 0.96 |
| Miscellaneous | 10 | 0.65 | 0.85 | 0.74 |
| Average | 30 | 0.81 | 0.93 | 0.86 |

Figure 8:
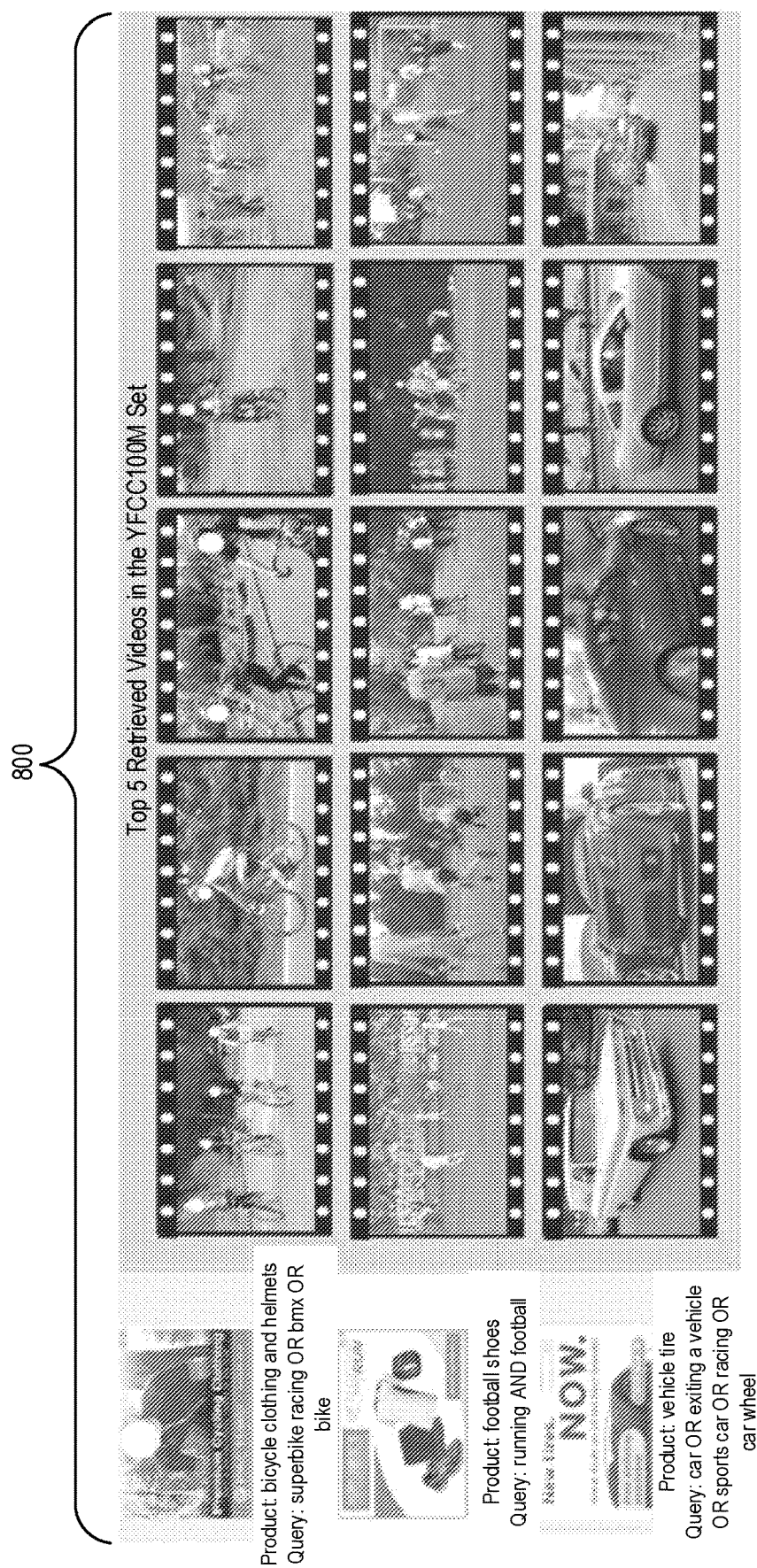
FIG. 8 shows the top 5 retrieved results for 3 example ads on the YFCC100M dataset.

The ads can be organized in 5 categories. As we see, the performance is much higher than the performance on the MED dataset in Table 2. The improvement is a result of the increased data volumes. Diagram 800 of FIG. 8 shows the top 5 retrieved videos are semantically relevant to the products in the ads. The results suggest that our method may be useful in enhancing the relevance of in-video ads, in addition to other applications where large content analysis is required.

The goals of the semantic concept embedding model are to 1) Capture the underlying semantic representations from large scale metadata, and 2) Build computable probabilistic representations which are generalizable for multiple NLP applications such as, but not limited to, 0Ex retrieval tasks. By analyzing the video-concept matrix, the correlation among concepts was investigated and a bottom-up concept hierarchy and clustering was built. The concept clustering than facilitates salient concept detection in a video, where the salient concept is identified according to the distance between concept name and video caption and the concept hierarchy. With the developed Concept Saliency and Inverse Video Frequency (CS-IVF) matrix, the importance of a concept and correlation between concepts can be evaluated. Combining CS-IVF with the document vectors derived from captions, the semantic concept embedding representation was then built where each entry indicates the probability of a word in the dictionary.

To compare and better utilize concepts, we start with the statistical analysis of concept responses which reflects whether a concept presents in a video. A semantic concept detector C (.), typically a SVM or DNN/RNN model, outputs a score x for a video v according to the extracted low-level features F (v). For N videos in the dataset D and M concepts, the video-concept frequency matrix encodes the responses of concepts to videos as:

$$X = \begin{bmatrix} x_{11} & x_{12} & \ldots & x_{1M} \\ x_{21} & x_{22} & \ldots & x_{2M} \\ \vdots & \vdots & \ddots & \vdots \\ x_{N1} & x_{N2} & \ldots & x_{NM} \end{bmatrix} \quad (7)$$

where $$x_{nm} = C_m(F_m(v_n)), n \in N, m \in M. \quad (8)$$

The video-concept matrix embeds the important information about relevance between concepts. Each column represents the responses of a concept detector. The higher the score, the more likely a concept presents in a video. On the other hand, the row vector captures the importance of concepts within a video. For the concept detectors of the same type (e.g. SVM), the scores share mathematical meaning as the distance to the support vectors. However, they are not comparable between two different types. For example, a 0.9 score from a SVM-based concept detector are not necessary more likely than a 0.7 score from a DCNN-based concept detector. Though the direct scores in a video are not necessarily comparable, the response of a concept over video dataset D reveals the correlation between concepts. For example, two concepts with responses [0.9, 0.6, 0.3] and [0.3, 0.2, 0.1] are "close" to each other. On the other hand, each row represents the appearance of concepts in a video. Response of concepts from the same external concept set are comparable since they share the same type. However, responses of concepts from different external concept sets are not comparable.

Similar to term frequency-inverse document frequency (TF-IDF) matrix, the importance of a concept is composed of two parts. Concept saliency stems from the row vectors of the video-concept matrix, captures relative importance within a video. Unlike the conventional term frequency function where the count of a term is discrete and well-defined, the responses are continuous and the value of different type concepts are not comparable.

Figure 9:
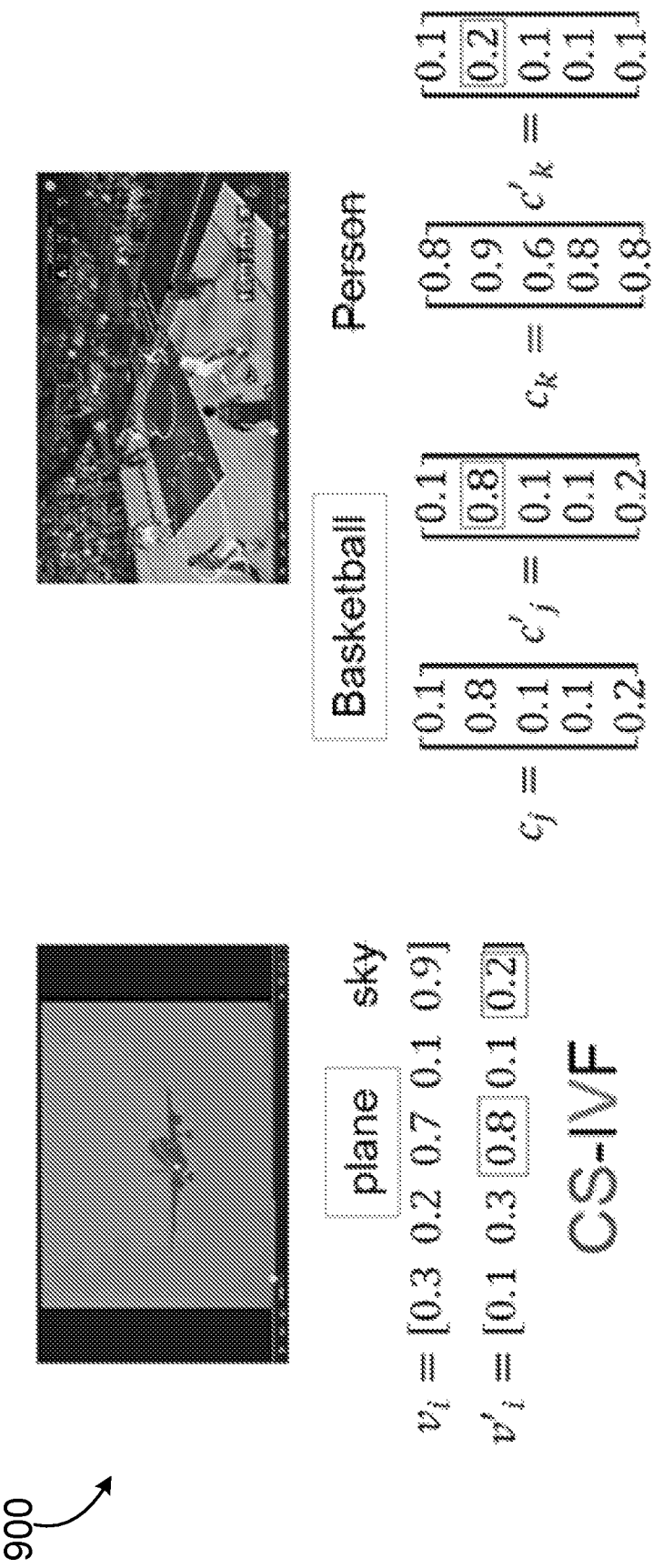
FIG. 9 is one example of a concept saliency-inverse video frequency (CS-IVF).

A concept saliency detection function CS(X, D) is proposed with supervised learning from captions in the dataset D extracting the salient concepts and weight the relevant concepts accordingly. The concept saliency detection transforms the importance of concepts and make its output score comparable among concepts. As shown in diagram 900 of FIG. 9, the "plane" concept is more salient than the "sky" according to the human annotation "a plane takes off from the airport". The relevant scores of "plane" and "sky" will be adjusted with the caption after concept saliency detection.

Furthermore, a word (such as a stop word) is less important (provides less information) if it appears in multiple documents. Similarly, if a video concept appears in lots of videos (a.k.a. stop-concepts), it is less informative for representation as well as for retrieval. For such stop-concepts which have high responses over videos, an IVF function is designed to lower its importance:

$$IVF(X, D) = \log \frac{N}{I(x_{nm} > \theta_m), v_n \in D} \quad (9)$$

where I (.) is the indicator function, $x_n m$ is the response of m-th concept for n-th video $v_n$ in the dataset, and $\theta_m$ is a pre-defined threshold of the concept detector. The final CS-IVF representation then can be represented as:

$$Y = CSIVF(X) = CS(X,D) \times IVF(X,D) \quad (10)$$

A task in current MED systems is to build the concept hierarchy and recommend user related concept during the search. Conventional approaches for this task are to use human labeled concept and build the hierarchy with the knowledge from annotator. It is therefore usually tedious, time-consuming and hard to scale up. Moreover, the distance measure among labels of concept name may fail to capture the real semantic meaning. This make conventional approach further infeasible.

Alternatively, we proposed an automated data-driven approach to capture the similarity among concepts and build a bottom-up hierarchy. The video-concept provides crucial information for similarity analysis among concepts. If two concepts are relevant to each other, the two concepts detectors would share similar output scores over the videos in the dataset. That is, the responses in video concept matrix would be similar. We utilize column vectors $C_j$ and $C_k$ in X as sufficient statistics in similarity measure between concepts i and j. With different output scale of concept detectors, a scale-invariant similarity measure among two column vectors $C_j$ and $C_k$ is more feasible. We utilize cosine similarity measure:

$$sim(C_i, C_j) = \frac{C_i \cdot C_j}{|C_i||C_j|} \quad (11)$$

With the similarity measure, a concept is merged with the closest concept and the new clustering center lies at is the mean of the cluster member. Repeat this process and merge concepts accordingly then a data-driven bottom up hierarchy can be derived. The hierarchical concept clustering can also be achieved by applying a threshold $\theta_h$ over the distance between a member to the cluster center. The name of the cluster $c_t$ is the name of concept with minimum distance to the updated cluster center. The following algorithm summarizes the proposed approach:

---

Algorithm 1: Automated Concept Hierarchy Generation Algorithm

Result: A=Concept HAC(X)
    initialization;
    for j ← 1 to M do
    | for k ← 1 to M do
    | | $C_j$ = j-th column vector in X;
    | | $C_k$ = k-th column vector in X;
       Q[j][k] ← sim($C_j$, $C_k$);
       I[j] = 1keeps track of active clusters
    | end
    end
    A ← [ ] assembles clustering as a sequence of merges
    for i ← 1 to N − 1 do
    | < i, m >← $\mathrm{argmax}_{<i,m>:i=m \wedge I[i]=1 \wedge I[m]=1}$ Q[i][m];
    | A.append(< i, m >) (store merge)
    | for j ← 1 to M do
    | | Q[i][j] ← sim($C_i$, $C_j$)
    | | Q[j][i] ← sim($C_i$, $C_j$)
    | | I [m] ← 0(deactivate cluster)
    | end
    end

---

Heuristically, the caption of a video reflects the salient concepts in the footage. For example, for a video description "a plane takes off from the airport", the important(salient) concepts should be "airplane", "airport" instead of "sky" or "blue". To capture these salient concepts, we propose a supervised learning approach. We utilize the word embedding (i.e. word2vec) distance between the video caption and the original concept name to determine whether a concept is salient. Salient concept is determined by the maximum similarity between the video caption $Cap(v_n)$ and the name of concept cluster $c_t$ with a threshold $\theta_c$. That is, $$s_{nm} = CS(x_{nm}, D) = I(\max(Cap(v_n), c_t) > \theta_c), m \in c_t \text{(concept cluster)} \quad (12)$$

In the training phase, the human captions of videos can be viewed as the labels of the supervised learning problem. If the distance between the caption and the concept name is greater than the defined threshold, than the label is 1 and vice versa. Given the concept score distributions xn=c= $[c_1, c_2, c_3, \ldots, c_m, \ldots, c_M]$ where $c_j = x_{n,j}$ is jth concept response in a video $v_n$, we learn a model $s_m = E_m(c)$ which classifies a concept is salient or not ($s_m = 1$) for every concept m. We can rewrite Eq. 12 in the probability form as:

$$P([s_1, s_2, \ldots, s_m, \ldots, s_M] | c) = \prod_{m=1\ldots M} P(s_m = 1 | c) \quad (13)$$
$$= \prod_{m=1\ldots M} E_m(c)$$

It should be noted that Eq. 12 shares great potential in detecting salient concept in other applications such as caption generation or large scale video retrieval. In the testing phase, with the output scores c from concept detectors, we can then use the learned model Em, m=1 . . . M to determine the salient concepts in a video.

Figure 10:
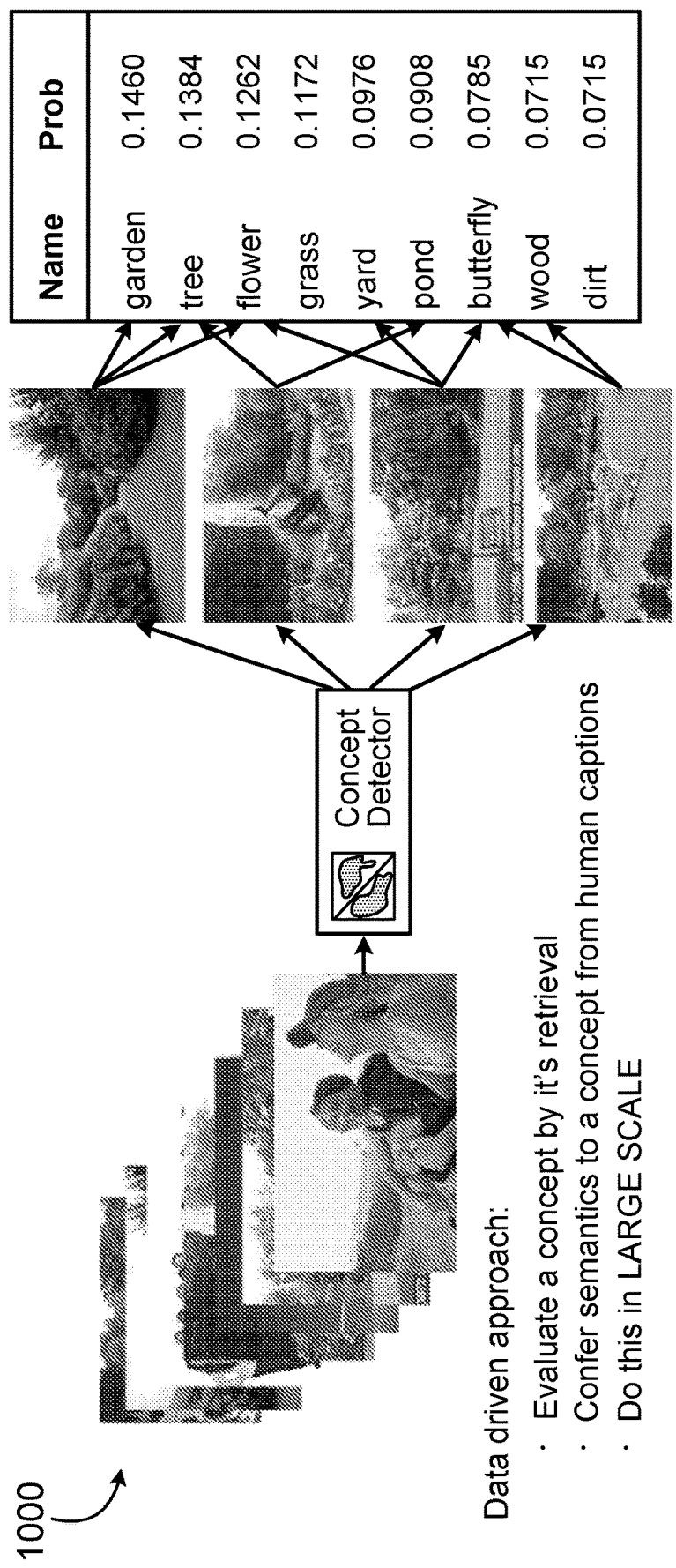
FIG. 10 demonstrates semantic concept embedding (distributional probabilistic representation).

In comparison to conventional semantic labeling which fails to capture real semantics for a concept. In our work we propose a data-driven approach to create real semantic meanings for concepts from the human-labeled captions. As depicted in diagram 1000 of FIG. 10, the intuition is to evaluate a concept by its retrieval outputs (CS-IVF) and human-labeled captions to bridge real semantics to the classifier model of concept in a large scale sense. For example, to link the SVM model and the textual description for a "garden" concept detector, we judge a concept by its retrieval outputs (pics on the right) from the dataset (pics on the left). We then use the captions in the retrieved result and the weights in the CS-IVF matrix to build a distributional probabilistic representation for the concept. In this case, a "garden" SVM detector semantically detects "garden", "tree", "flower", "grass", "wood" . . . etc. For a semantic concept, what the model embeds are people's real descriptions for the retrieval results. This representation reflects the real semantics people use to describe a concept, which is an inherently suitable and applicable representation for video concepts in many NLP tasks. In the following we facilitate the details of this approach.

First, captions of videos in the dataset are used to build a dictionary and generates document(video) vectors for every video. After building the video term matrix T, we utilize similarity measure to estimate the relative importance of different terms over videos. Each row vector $d_n = [d_{n1}, d_{n2} \ldots d_{nk} \ldots d_{nK}]$ in T' represents the importance of each term k, where K is the size of dictionary. Finally the CS-IVF matrix in Eq. 10 is used to weight the document vectors of videos and form the final representation $\varphi_m$ for m-th video concept. Its mathematical form is:

$$\phi_m = \sum_{n=2}^{N} d_n y_{nm} \quad (14)$$

Given the user query, SQG select a set of most relevant and discriminative concepts. We propose a new objective function for SQG:

$$z(m) = w_s S(m,q) + (1-w_s) R(m) \quad (15)$$

where z(m) is the score of the concept m, $w_s$ is the weight for semantic relevance function $S(m, q) = sim(\varphi_m, \varphi_q)$ between the semantic concept embedding $\varphi_m$ and the query vector $\varphi_q$ generated by the same dictionary in the training phase. The functionality of S(m, q) aims at selecting most semantically relevant concepts. One feasible similarity measure is cosine similarity as stated in Eq.11. Not only the semantic relevance but also the discriminative quality of a concept should be considered. The second term of the proposed objective function, the retrieval scoring function R(m), which aims at selecting discriminative concepts is defined as:

$$R(m) = \sum_{i=1...L} w_i F_i(m) \quad (16)$$

where L is the number of feature which evaluates the quality of a concept. In this work, two features are considered in 0Ex task. The first one is normalized IVF:

$$F_{IVF}(m) = \frac{1}{N} \sum_n IVF(X_{mn}) \quad (17)$$

which lowers the score if a concept outputs high scores over all the videos. A more discriminative (with varying outputs over videos) concept detector are more preferred in the normalized IVF function. Additionally, the weighted similarity among top 10 retrieval results are also considered:

$$F_{SIM}(m) = \sum_{i,i'=1\,10, i! = i'} w_i w_{i'} sim(x_i, x_{i'}) \quad (18)$$

This feature shares a similar intuition as P@10 measure. If the top retrieval results of a concept are more consistent/similar to each other, then the concept is more likely to be effective. Combining the semantic and retrieval scoring, SQG then suggests top k concepts with the weights as normalized scores accordingly.

The qualitative and quantitative results of the proposed method on concept hierarchy generation, concept saliency detection and semantic concept embedding are demonstrated first. Then the effectiveness of proposed automatic SQG using semantic concept embedding for 0Ex MED task in MED14Test collection is validated.

Video Data Set and Concept Detector Set. Concept hierarchy, saliency and embedding are trained on TRECVID Multimedia Event Detection (MED) Research and Kindred video set with 23,699 videos. We conducted 0Ex experiments on TRECVID MED14Test, including 20 events and 25,000 testing videos, evaluated with the official metric Mean Average Precision (MAP). The official test split released by NIST is used, and the reported MAP is comparable with others on the same split. The 0Ex experiments are conducted without using any examples but relying merely on a clear description of the targeted event (e.g., renovating a home). Similar to experiments described in the Content Adjustment section above, we also evaluated each experiment on 10 randomly generated splits to reduce the bias brought by the split partition. The mean and 90% confidence interval are reported.

The semantic concepts are directly trained on videos by the SVM-based self-paced learning pipeline. The video datasets are described below. In total, 1,433 video-based semantic concept detectors are trained using improved dense trajectory features with 1.2 million CPU hours on the Pittsburgh Supercomputing Center computer cluster.

Diagram 1100 of FIG. 11(*a*) depicts a subset of the qualitative results with the proposed hierarchical clustering algorithm based on video-concept matrix. There are 10 levels in the resulting concept hierarchy with respect to predefined similarity thresholds for the concept clustering. It can also be shown in the index 1150 of FIG. 11(*b*) that the concept names (original labels) of the cluster members validate the effectiveness of the proposed algorithm.

It is notable that this approach is generalizable for heterogeneous concepts sets. For example, a YFCC concept may be within the same cluster with a DCNN concept because they share similar output scores even if they may share a very different scale. As a result, our clustering algorithm based on video-concept matrix achieve a scale invariant concept clustering for diverse concept detector outputs.

The table 1200 of FIG. 12 shows the qualitative effectiveness of the proposed CS-IVF approach in comparison with state-of-the-art MED system. The proposed CS-IVF matrix successfully extracts the salient concepts within a video while current MED outputs are noisy due to the less informative concept such as "primate" and "person" in HVC00003 and non-salient concepts such as "leg" in HVC014100 with higher ranking. Additionally, Table 7 depicts the quantitative result of the proposed approach. The averages of maximum similarity between caption and top 5 concept name are 0.21 and 0.05 with/without CS-IVF. Both results imply the improvement of CS-IVF over current MED system.

TABLE 7

| Quantitative result of CS-IVF | | |
|---|---|---|
|  | current MED | new |
| Similarity | 0.0513 | 0.212 |

The aim of the semantic concept embedding to big data to bridge the ultimate semantic gap between video concepts models and real semantics, which can have effects for Big Data applications. In this section we demonstrate the effect of changing size of training dataset for the embedding model.

As shown in the results 1300 in FIG. 13, as the size of training dataset N increases, noise in the proposed semantic concept representation is smoothed. For example, in the garden concept, when N=23699, a "chainsaw" are embedded in the representation. As N to increases 52854, the noise is smoothed. The "india" in traffic concept is another interesting example. When N is small, training videos with caption "india" are retrieved by the "traffic" concept. The authentic meaning such as "driving" in the concept "traffic" is then surface as N grows. The proposed semantic concept embedding model genuinely reflects the characteristic of the dataset and captures the real human descriptions of retrieval outputs of a concept detector. With a large N, the small variation will be smoothed and the representation become asymptotically close to the real knowledge representation of a video concept.

It should also be noted that the semantic concept embedding model is applicable not only for video concepts but also for audio (e.g. Noiseme) concepts. The only requirement is to extract the according responses for these multiple modality concept detectors.

We use the state-of-art MED pipeline in which comprises four major components: Video Semantic INdexing (VSIN), Semantic Query Generation (SQG), Multimodal Search, and Pseudo-Relevance Feedback/Fusion. VSIN extracts semantic features from input videos, and indexes them for efficient online search. In this study, we focus on using the visual/ audio features to test the effectiveness of semantic concept embedding aspect of the present invention. Automatic SQG converts a user query into a multi-modal system query, which are fed into the Multimodal Search component to retrieve a ranked list for each modality. Finally, the ranked lists are fused and re-ranked by the Pseudo-Relevance Feedback/Fusion component. The desired features of a SQG is to identify relevant and discriminative concepts given the user query. In the SQG pipeline, we first utilize TF-IDF and stop-word stemming to extract key terms from the event kit description. The key terms are then used to map the concepts with semantic concept embedding. The selected concepts then be used as event queries for subsequent retrieval process.

We apply the SQG methods to translate the key terms in the query into concepts in the system vocabulary, and then use these concepts to search results for each event. Four SQG mapping methods are used as our baseline comparison. Exact word matching automatically selects the exact matched concept name with the input terms.

WordNet mapping estimates the similarity between the concept name and input term based on their distance in the WordNet taxonomy. WordNet mapping is good at capturing synonyms and subsumption relations between two nouns.

PMI Mapping estimates the relationship between two terms based on their Point-wise Mutual Information (PMI). PMI mapping assumes that similar words tend to co-occur more frequently, and thus is good at capturing frequently co-occurring concepts. Thus the computation of PMI relies on a large corpus (such as Wikipedia articles).

Word embedding mapping: This method is also to capture the frequent co-occurred words in similar contexts. In this mapping, the words are represented in a low dimensional vector space, and the cosine coefficient is used to measure their distance. Word embedding is used to predict the surrounding words in a sentence, and usually learned by neural network models.

For the fusion part, the concept list obtained by the above four methods are fused together. Different fusion method can be used to obtain the final fusion list, for example, Borda count method based on the ranking position of each concept in the original lists. In implementation, the fusion list for each event are used for fair comparisons. For Exact Word Matching, WordNet Mapping, PMI mapping, Word Embedding Mapping and Fusion methods, the 3 most relevant concepts are used for video retrieval.

Figure 14:
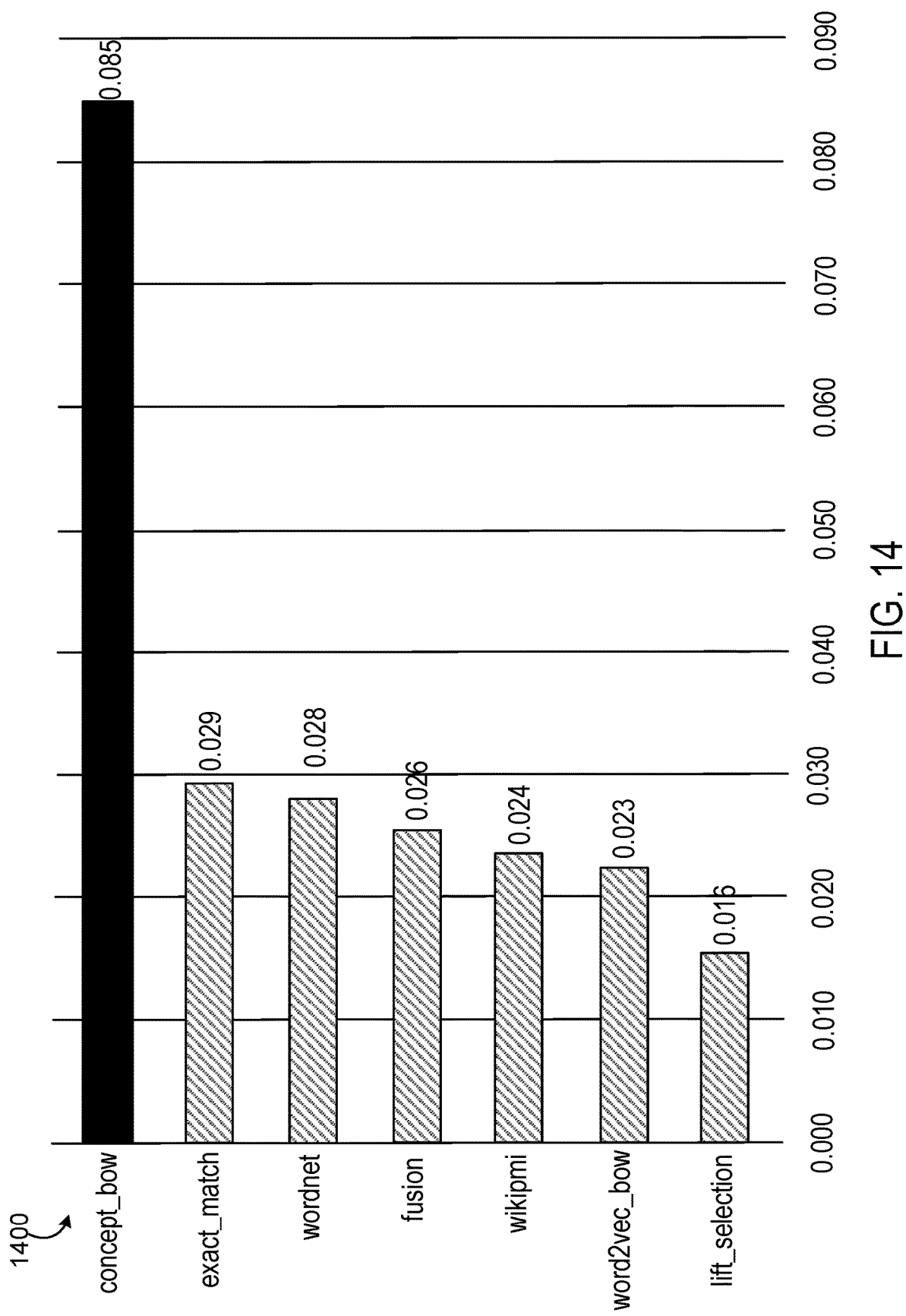
FIG. 14 is a baseline comparison of the results of the 0Ex MAP with the semantic concept embedding model described herein.

Graph 1400 of FIG. 14 shows the results of the 0Ex MAP of the proposed semantic concept embedding model in comparison with baseline approaches. The model described herein achieves a 0.085 MAP which outperforms best baseline (exact match) by 0.056, which is 2.93 times better. The exact word matching has the best performance in the baseline algorithms, followed by Wordnet similarity, which is feasible to capture the synonyms of noun best fails in verbs. PMI of wiki and word2vec suffers further from its ambiguity in representing exact relevance between text query and video concept.

Figure 15:
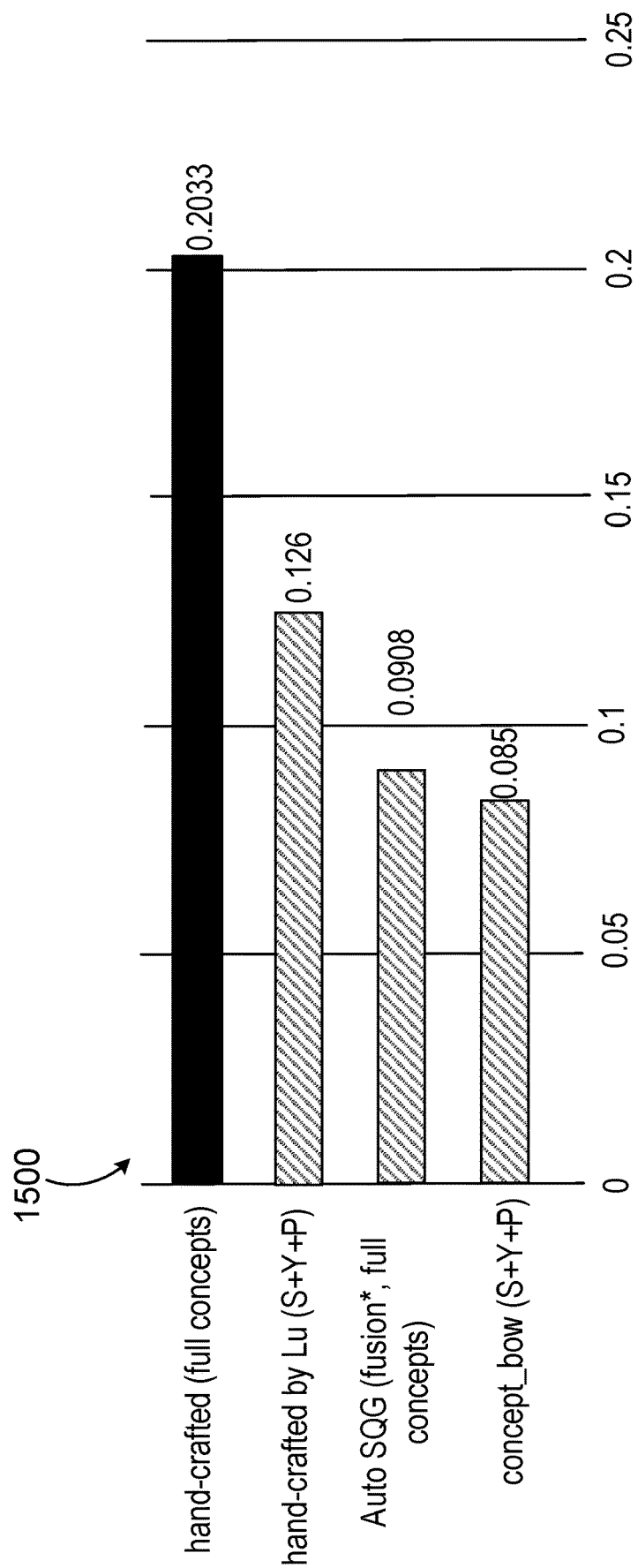
FIG. 15 is a state-of-art comparison with the semantic concept embedding model described herein.

From graph 1500 of FIG. 15, we know that with 3 subsets (YFCC, SIN, and Sports) of concept sets, the proposed semantic concept embedding is comparable with state of art automatic SQG with all features including additional DC N N, OC R, ASR, DI Y concept sets which are crucial in retrieving event 22, 24, 25, 26, 30.31, 32, 38, 39, 40. The best result of manually crafted SQG and fusion with the 3 concept sets is 0.126. While the best manually crafted SQG and fusion can achieve 0.203, our approach shows great potential if more concepts are considered.

Conventional automatic SQG methods map key terms to concepts based on their similarity derived on external text only knowledge or corpus. However, there is a glitch between the video dataset used for concept training and the external knowledge source. We observed that it is hard for these mapping capture find discriminative concepts, such as "bmx" for bike trick and "rally obedience" for dog show. Besides, without investigating the relationship between concepts within/over heterogeneous concept sets, combination of individual mapping of each term to name of concept may reduce the representativeness and discrimination of the final concepts to original key terms with the introduced noise in retrieval ranked list.

Figure 16A:
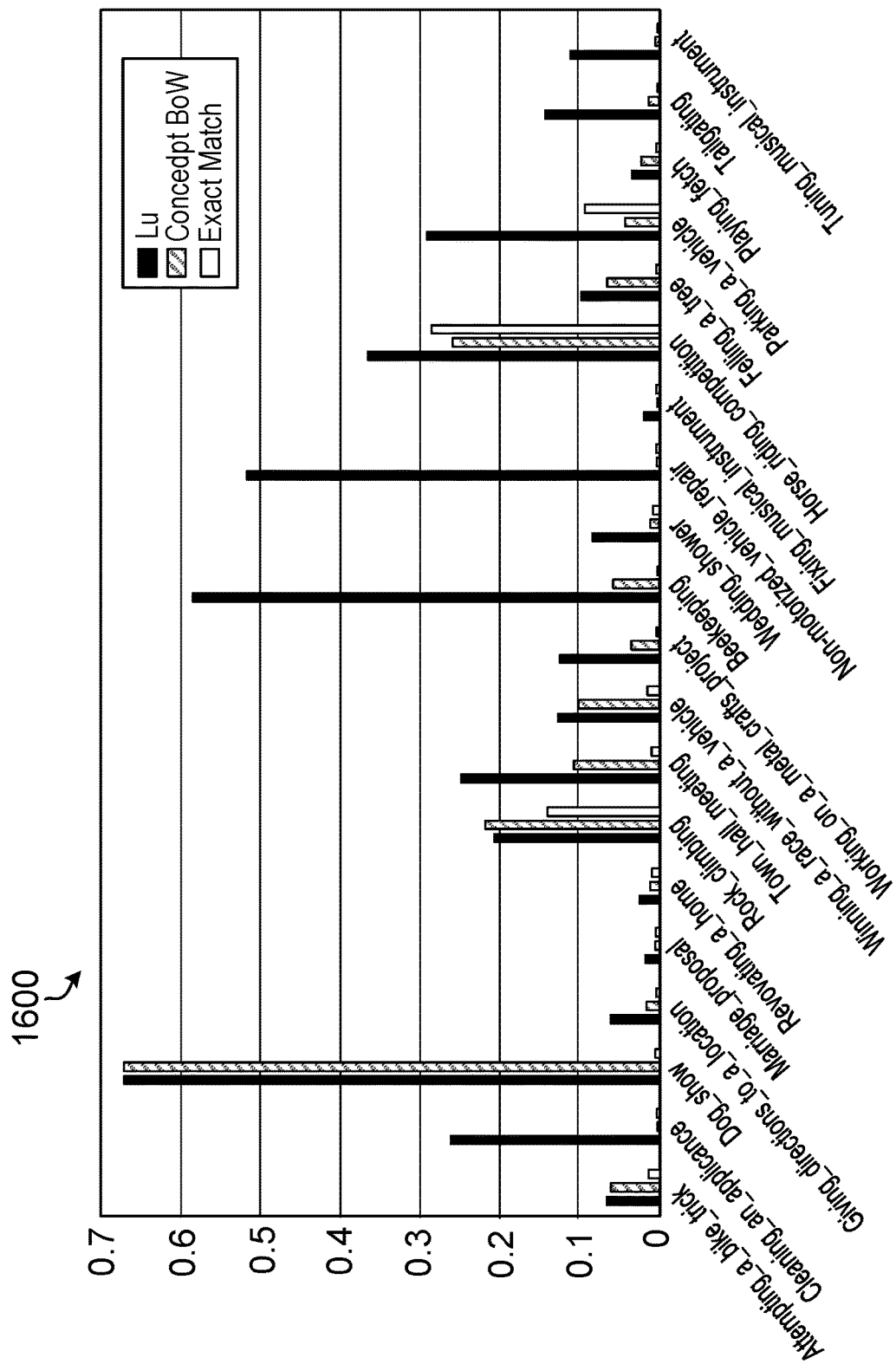

FIGS. 16A-16B shows the quantitative and qualitative error analysis in graph 1600 and results 1650. Comparing the exact match and the proposed concept BoW, we can find that in most events the retrieval results are improved because the proposed method recommends more relevant and discriminative concept in comparison with exact match. With a more complete understanding about what a concept detector detects in the video, not only the appearance of a specific objects but also the scene, co-occurrence, etc., the proposed semantic concept embedding achieves a better performance in comparison with conventional automatic SQG methods. For example, for event E021, "Attempting a bike trick", our model suggests "SPORTS478 12 bmx". The exact match cannot capture the real semantic relationship between the concept "bmx" and the event kit description. Also, by no means can word2vec and wikipmi captures such relationship. In contrast, the proposed model successfully confers the authentic semantics for the concept "SPORTS478 12", which is related to bike and trick. In many events the real semantics benefits the proposed model to achieve better performance than baselines.

Another interesting problem in MED is how to evaluate the performance of a concept detector. One of the most important feature is the manually labeled P@10 score of concept detectors. A higher P@10 score heuristically implies that a concept detector has a more relevant and consistent retrieval output. However, in the related experiment, we find the P@10 label are not very reliable.

FIG. 17 shows some of the worst P@10 in MED concept set in diagram 1700. The irrelevant retrieval results with respect to the original concept name label result in a poor P@10 score. However, investigating the representation of the proposed semantic embedding model, one may find out that these bad concept detectors may not be that bad. Take "YFCC609 520 whale" as an example, the P@10 is 1 since it retrieves only one whale in the top 10 shot. This result is based on the assumption that it is a "whale" detector. However, the semantic concept embedding shows that instead of detecting whales, it actually detects ocean, results in a feasible ocean detector. The contradiction among P@10 results and semantic concept embedding implies that we need a better approach to understand a concept, and the later may be a good approach with the better MAP in retrieval. The data-driven CS-IVF video-concept matrix and TF-IDF video-caption matrix contribute to a better embedding for semantic concepts.

Figure 18:
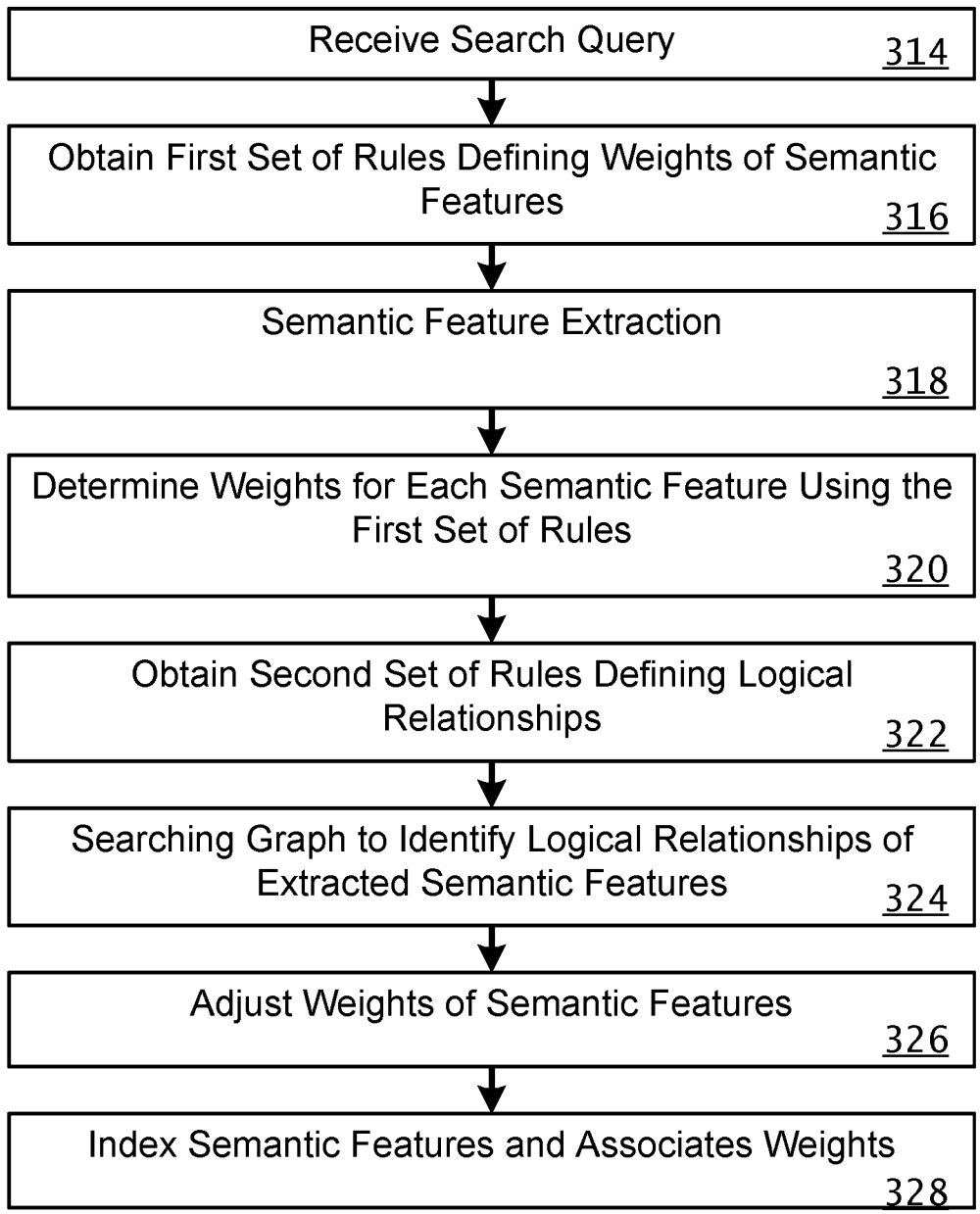
FIG. 18 is a flowchart showing an exemplary process for retrieval of audio-visual recordings.

FIG. 18 is a flowchart showing an exemplary process 300 for retrieval of audio-visual recordings. An application interface receives search query is received (314), such as through application interface 64 of FIG. 1. The search retrieval system 50 obtains (316) first set of rules defining weights of semantic features, such as the rules described above in relation to FIGS. 2-3. An extraction engine, such as extraction engine 68 of FIG. 1, extracts (318) the semantic features according to the first set of rules. The extraction engine determines (320) the weights of each semantic feature using the first set of rules. A logic execution engine, such as logic execution engine 70 of FIG. 1, obtains (322) a second set of rules, such as the logical and distributional consistency rules described above. The graph of nodes and edges of the logic execution engine is searched to identify (324) the logical relationships. The search retrieval system adjusts (326) the weights of the semantic features according to the second set of rules described above. An indexing engine, such as the indexing engine 66 of FIG. 1, indexes the semantic features and adjusted weights and associates the semantic features, weights, and metadata (if any) with an identifier of the audio-visual recording.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the techniques described herein.

What is claimed is:

1. A search retrieval system for automatically indexing data representing audio-visual recordings and for querying, responsive to a search query, that indexed data representing the audio-visual recordings, the search retrieval system comprising:
    at least one processing device; and
    a memory storing instructions that are executable by the at least one processing device to cause the at least one processing device to perform operations including:
        obtaining a first set of rules that define weights for semantic features of an audio-visual recording, the semantic features representing content of the audio-visual recording, wherein a weight specifies a likelihood of a semantic feature occurring in the audio-visual recording, the first set of rules comprising a regularization model that enforces a distributional consistency among the semantic features, the distributional consistency including a selection of semantic features that is representative of the audio-visual recording and excluding semantic features that are not representative of the audio-visual recording according to a regularization parameter of the regularization model;
        extracting, based on execution of the first set of rules, one or more semantic features from the audio-visual recording so that the distributional consistency among the semantic features is satisfied for the audio-visual recording;
        determining, based on the execution of the first set of rules, a weight for each of the one or more semantic features;
        obtaining a second set of rules that define logical relationships between semantic features, wherein a logical relationship is represented by an edge between two nodes in a graph, wherein each node in the graph represents a semantic feature, and wherein the logical relationship represents whether the two nodes represent inclusive semantic features that both can occur in the content of the audio-visual recording or whether the two nodes represent exclusive semantic features that both cannot occur in the content of the audio-visual recording;
        based on execution of the second set of rules, searching the nodes in the graph to identify one or more logical relationships for the one or more semantic features extracted;
        based on searching of the nodes, adjusting one or more weights for each of the one or more semantic features, respectively,
        wherein adjusting the one or more weights comprises removing or including one or more semantic features as representing the content in the audio-visual recording based on the logical relationship; and
        automatically indexing data representing the audio-visual recording, with the data being indexed in association with the one or more adjusted weights for the one or more semantic features, respectively.

2. The content retrieval system of claim 1, wherein the semantic features comprise one or more of a visual feature, a textual feature, or an audio feature.

3. The content retrieval system of claim 1, wherein the semantic features are indicative of one or more subjects of the audio-visual recording.

4. The content retrieval system of claim 1, wherein data representing the one or more semantic features extracted are each associated with a timestamp indicative of a time at which the semantic feature is presented during the audio-visual recording.

5. The content retrieval system of claim 1, further comprising:
    receiving a search query indicative of one or more semantic features; and
    querying the index for indexed data representing one or more audio-visual recordings associated with the one or more semantic features indicated in the search query.

6. The content retrieval system of claim 5, further comprising:
    based on the indexed data, retrieving the one or more audio-visual recordings; and
    ranking the one or more audio visual recordings based on their adjusted weighting scores.

7. The content retrieval system of claim 5, wherein the search query comprises one of a modality query, a text query, a temporal query, or a Boolean query.

8. The content retrieval system of claim 1, wherein the second set of rules that define logical relationships between semantic features define a probability that a first semantic feature occurs with a second semantic feature in an audio-visual recording, wherein the one or more semantic features extracted comprise at least one of the first semantic feature or the second semantic feature.

9. The content retrieval system of claim 1, wherein the logical relationship represents an inclusive logical relationship between a first node and a second node in which a first weighting score of a first semantic feature represented by the first node is less than the second weighting score of the second semantic feature represented by the second node.

10. The content retrieval system of claim 1, wherein the logical relationship represents an exclusive logical relationship between a first node and a second node in which a semantic feature represented by either the first node or the second node has a specified weighting score.

11. The content retrieval system of claim 1, further comprising training the second set of rules by clustering one or more semantic features using labeled training data.

12. A method performed by a search retrieval system for automatically indexing data representing audio-visual recordings and for querying, responsive to a search query, that indexed data representing the audio-visual recordings, the method comprising:
   obtaining a first set of rules that define weights for semantic features of an audio-visual recording, the semantic features representing content of the audio-visual recording, wherein a weight specifies a likelihood of a semantic feature occurring in the audio-visual recording, the first set of rules comprising a regularization model that enforces a distributional consistency among the semantic features, the distributional consistency including a selection of semantic features that is representative of the audio-visual recording and excluding semantic features that are not representative of the audio-visual recording according to a regularization parameter of the regularization model;
   extracting, based on execution of the first set of rules, one or more semantic features from the audio-visual recording so that the distributional consistency among the semantic features is satisfied for the audio-visual recording;
   determining, based on the execution of the first set of rules, a weight for each of the one or more semantic features;
   obtaining a second set of rules that define logical relationships between semantic features, wherein a logical relationship is represented by an edge between two nodes in a graph, wherein each node in the graph represents a semantic feature, and wherein the logical relationship represents whether the two nodes represent inclusive semantic features that both can occur in the content of the audio-visual recording or whether the two nodes represent exclusive semantic features that both cannot occur in the content of the audio-visual recording;
   based on execution of the second set of rules, traversing the nodes in the graph to identify one or more logical relationships for the one or more semantic features extracted;
   based on traversal of the nodes, adjusting one or more weights for each of the one or more semantic features, respectively wherein adjusting the one or more weights comprises removing or including one or more semantic features as representing the content in the audio-visual recording based on the logical relationship; and
   automatically indexing data representing the audio-visual recording, with the data being indexed in association with the one or more adjusted weights for the one or more semantic features, respectively.

13. The method of claim 12, wherein the semantic features comprise one or more of a visual feature, a textual feature, or an audio feature.

14. The method of claim 12, wherein the semantic features are indicative of one or more subjects of the audio-visual recording.

15. The method of claim 12, wherein data representing the one or more semantic features extracted are each associated with a timestamp indicative of a time at which the semantic feature is presented during the audio-visual recording.

16. The method of claim 12, further comprising:
   receiving a search query indicative of one or more semantic features; and
   querying the index for indexed data representing one or more audio-visual recordings associated with the one or more semantic features indicated in the search query.

17. The method of claim 16, further comprising:
   based on the indexed data, retrieving the one or more audio-visual recordings; and
   ranking the one or more audio visual recordings based on their adjusted weighting scores.

18. The method of claim 16, wherein the search query comprises one of a modality query, a text query, a temporal query, or a Boolean query.

19. The method of claim 12, wherein the second set of rules that define logical relationships between semantic features define a probability that a first semantic feature occurs with a second semantic feature in an audio-visual recording, wherein the one or more semantic features extracted comprise at least one of the first semantic feature or the second semantic feature.

20. The method of claim 12, wherein the logical relationship represents an inclusive logical relationship between a first node and a second node in which a first weighting score of a first semantic feature represented by the first node is less than the second weighting score of the second semantic feature represented by the second node.

21. The method of claim 12, wherein the logical relationship represents an exclusive logical relationship between a first node and a second node in which a semantic feature represented by either the first node or the second node has a specified weighting score.

22. The method of claim 12, further comprising training the second set of rules by clustering one or more semantic features using labeled training data.

23. A non-transitory computer readable medium for storing instructions for performing one or more operations for automatically indexing data representing audio-visual recordings and for querying, responsive to a search query, that indexed data representing the audio-visual recordings, the one or more operations comprising:
   obtaining a first set of rules that define weights for semantic features of an audio-visual recording, the semantic features representing content of the audio-visual recording, wherein a weight specifies a likelihood of a semantic feature occurring in the audio-visual recording, the first set of rules comprising a regularization model that enforces a distributional consistency among the semantic features, the distributional consistency including a selection of semantic features that is representative of the audio-visual recording and excluding semantic features that are not representative of the audio-visual recording according to a regularization parameter of the regularization model;
   extracting, based on execution of the first set of rules, one or more semantic features from the audio-visual recording so that the distributional consistency among the semantic features is satisfied for the audio-visual recording;
   determining, based on the execution of the first set of rules, a weight for each of the one or more semantic features;
   obtaining a second set of rules that define logical relationships between semantic features, wherein a logical relationship is represented by an edge between two nodes in a graph, wherein each node in the graph represents a semantic feature, and wherein the logical relationship represents whether the two nodes represent inclusive semantic features that both can occur in the content of the audio-visual recording or whether the two nodes represent exclusive semantic features that both cannot occur in the content of the audio-visual recording;

based on execution of the second set of rules, traversing the nodes in the graph to identify one or more logical relationships for the one or more semantic features extracted;

based on traversal of the nodes, adjusting one or more weights for each of the one or more semantic features, respectively, wherein adjusting the one or more weights comprises removing or including one or more semantic features as representing the content in the audio-visual recording based on the logical relationship; and automatically indexing data representing the audio-visual recording, with the data being indexed in association with the one or more adjusted weights for the one or more semantic features, respectively.

24. A search retrieval system for automatically indexing data representing videos and for querying that indexed data representing the video, the search retrieval system comprising:

at least one processing device; and a memory storing instructions that are executable by the at least one processing device to cause the at least one processing device to perform operations including:

receiving a search query;

receiving a video associated with metadata, the metadata comprising one or more of automatic speech recognition data, optical character recognition data, a textual description, and one or more semantic features, the one or more semantic features being indicative of one or more subjects of the video, wherein a weight specifies a likelihood of a semantic feature occurring in the video;

obtaining a first set of rules that define weights for the one or more semantic features detected for a video using the metadata, the first set of rules comprising a regularization model that enforces a distributional consistency among the semantic features, the distributional consistency including a selection of semantic features that is representative of the video and excluding semantic features that are not representative of the video according to a regularization parameter of the regularization model;

extracting, based on the first set of rules, the one or more semantic features from the video so that the distributional consistency among the semantic features is satisfied for the video;

determining, based on the first set of rules, a weighting score for each of the one or more semantic features;

obtaining a second set of rules that define one or more logical relationships for the one or more semantic features, the second set of rules defining distributional logical relationships using a regularization term, and the second set of rules further defining a hierarchy of distributional logical relationships using a graph of nodes and edges, wherein a logical relationship is represented by an edge between two nodes in the graph, wherein each node in the graph represents a semantic feature, and wherein the logical relationship represents whether the two nodes represent inclusive semantic features that both can occur in the one or more subjects of the video or whether the two nodes represent exclusive semantic features that both cannot occur in the one or more subjects of the video;

based on execution of the second set of rules, searching the nodes in the graph to identify the one or more distributional logical relationships for the one or more semantic features;

based on the searching of the nodes, adjusting the weighting score for each of the one or more semantic features;

adjusting the weighting score for each of the one or more semantic features using the regularization term, wherein adjusting the one or more weights comprises removing or including one or more semantic features as representing the one or more subjects in the video based on the logical relationship; and automatically indexing data representing the video associated with the one or more semantic features each being associated with an adjusted weighting score.

* * * * *

UNITED STATES PATENT AND TRADEMARK OFFICE
CERTIFICATE OF CORRECTION

PATENT NO. : 11,023,523 B2
APPLICATION NO. : 15/769233
DATED : June 1, 2021
INVENTOR(S) : Alexander G. Hauptmann, Lu Jiang and Po-yao Huang It is certified that error appears in the above-identified patent and that said Letters Patent is hereby corrected as shown below:

In the Claims

Column 30, Line 50, delete "audio visual" and insert -- audio-visual --

Column 32, Line 12, delete "audio visual" and insert -- audio-visual --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*